(12) United States Patent
Yan et al.

(10) Patent No.: US 8,535,586 B2
(45) Date of Patent: Sep. 17, 2013

(54) HIGHLY BASIC IONOMERS AND MEMBRANES AND ANION/HYDROXIDE EXCHANGE FUEL CELLS COMPRISING THE IONOMERS AND MEMBRANES

(75) Inventors: Yushan Yan, Riverside, CA (US); Shuang Gu, Riverside, CA (US); Feng Wang, Croton-on-Hudson, NY (US)

(73) Assignee: The Regents of the University of California, Oakland, CA (US)

( * ) Notice: Subject to any disclaimer, the term of this patent is extended or adjusted under 35 U.S.C. 154(b) by 131 days.

(21) Appl. No.: 13/091,122

(22) Filed: Apr. 20, 2011

(65) Prior Publication Data

US 2012/0119410 A1 May 17, 2012

Related U.S. Application Data

(60) Provisional application No. 61/412,745, filed on Nov. 11, 2010, provisional application No. 61/414,878, filed on Nov. 17, 2010, provisional application No. 61/439,303, filed on Feb. 3, 2011, provisional application No. 61/449,084, filed on Mar. 3, 2011.

(51) Int. Cl.
*B29D 7/00* (2006.01)

(52) U.S. Cl.
USPC ........... 264/216; 264/658; 264/240; 264/236; 264/636; 264/212; 264/298; 264/299; 264/425; 264/459; 264/463; 264/477; 264/494; 264/496; 264/552; 264/209.6; 264/211.24; 264/272.13

(58) Field of Classification Search
USPC ................. 264/658, 240, 236, 636, 212, 298, 264/299, 425, 459, 463, 477, 494, 496, 552, 264/209.6, 211.24, 272.13, 216
See application file for complete search history.

(56) References Cited

U.S. PATENT DOCUMENTS

2011/0237690 A1 9/2011 Yan et al.

OTHER PUBLICATIONS

H. Bunazawa and Y. Yamazaki, "Influence of anion ionomer content and silver cathode catalyst on the performance of alkaline membrane electrode assemblies (MEAs)for direct methanol fuel cells (DMFCs)", Journal of Power Sources 182 (1), 48 (2008).
E. Avram, E. Butuc, C. Luca, I. Druta, "Polymers with Pendant Functional Group.III. Polysulfones Containing Viologen Group" Journal of Macromolecular Science-Pure and Applied Chemistry A34, 1701 (1997).
E. Agel, J. Bouet, and J. F. Fauvarque, "Characterization and use of anionic membranes for alkaline fuel cells", Journal of Power Sources 101 (2), 267 (2001).

(Continued)

*Primary Examiner* — Jeffrey Wollschlager
*Assistant Examiner* — Stella Yi
(74) *Attorney, Agent, or Firm* — Berliner & Associates

(57) ABSTRACT

A family of functionalized polymers is provided capable of forming membranes having exceptional OH⁻ ionic conductivity as well as advantageous mechanical properties, which may be applied to membranes including such polymers for use in, e.g., AEMFC/HEMFC fuel cells. Preferred functional groups include a quaternary phosphonium, and the polymer may specifically be (tris(2,4,6-trimethoxyphenyl) phosphine)₃ functionalized phosphonium polysulfone hydroxide, ECL-PVBC-QPOH, or QPOH based on any of the commercial polymers including polycarbonate (PC), poly(2,6-dimethyl-1,4-phenylene oxide) (PPO), polyetherimine (PEI), poly(ether sulfone) (PES), poly(phenylene sulfoxide) PPS, poly(ether ether ketone) (PEEK), or polybenzimidazole (PBI), polyvinyl chloride (PVC). An ionomer membrane may include polysulfone based TPQPOH, ECL-PVBC-QPOH, and/or PPO.

22 Claims, 10 Drawing Sheets

(56) References Cited

OTHER PUBLICATIONS

V. Cozan and E. Avram, "Side chain thermotropic liquid crystalline polysulfone obtained from polysulfone udel by chemical modification", European Polymer Journal 39 (1), 107 (2003).

C. Coutanceau, L. Demarconnay, C. Lamy et al., "Development of electrocatalysts for solid alkaline fuel cell (SAFC)", Journal of Power Sources 156 (1), 14 (2006).

J. Fang and P. K. Shen,"Quaternized poly(phthalazinon ether sulfone ketone) membrane for anion exchange membrane fuel cells". J Membrane Sci 285 (1-2), 317 (2006).

T. D. Gierke, G. E. Munn, and F. C. Wilson, "The Morphology in Nafion Perfluorinated Membrane Products, as Detemined by Wide- and Small- Angle X-Ray Studies", J Polym Sci Pol Phys 19 (11), 1687 (1981).

S. Gu, R. Cai, T. Luo et al., "A Soluble and Highly Conductive Ionomer for High-Performance Hydroxide Exchange Membrane Fuel Cells", Angew Chem Int Edit 48 (35), 6499 (2009).

Hiroyuki Yanagi and Kenji Fukuta, "Anion Exchange Membrane and Ionomer for Alkaline Membrane Fuel Cells (AMFCs)", ECS Trans 16 (2), 257 (2008).

H. Y. Hou, G. Q. Sun, R. H. He et al., "Alkali doped polybenzimidazole membrane for high performance alkaline direct ethanol fuel cell", Journal of Power Sources 182 (1), 95 (2008).

C. Lamy, E. M. Belgsir, J. M. Leger, "Electrocatalytic oxidation of aliphatic alcohols: Application to the direct alcohol fuel cell (DAFC)", Journal of Applied Electrochemistry 31, 799 (2001).

L. Li and Y. X. Wang, "Quaternized polyethersulfone Cardo anion exchange membranes for direct methanol alkaline fuel cells", Journal of Membrane Science 262 (1-2), 1 (2005).

S. F. Lu, J. Pan, A. B. Huang et al., "Alkaline polymer electrolyte fuel cells completely free from noble metal catalysts", P Natl Acad Sci Usa 105 (52), 20611 (2008).

K. Matsuoka, Y. Iriyama, T. Abe et al., "Alkaline direct alcohol fuel cells using an anion exchange membrane", Journal of Power Sources 150, 27 (2005).

J. S. Park, S. H. Park, S. D. Yim et al., "Performance of solid alkaline fuel cells employing anion exchange membranes", J Power Sources 178 (2), 620 (2008).

Jin-Soo Park, Gu-Gon Park, Seok-Hee Park et al., Development of Solid-State Alkaline Electrolytes for Solid Alkaline Fuel Cells, Macromol Symp 249-250 (1), 174 (2007).

R. C. T. Slade and J. R. Varcoe, "Investigations of conductivity in FEP-based radiation-grafted alkaline anion-exchange membranes", Solid State Ionics 176 (5-6), 585 (2005).

D. Stoica, L. Ogier, L. Akrour et al., "Anionic membrane based on polyepichlorhydrin matrix for alkaline fuel cell: Synthesis, physical and electrochemical properties", Electrochim Acta 53 (4), 1596 (2007).

J. R. Varcoe, R. C. T. Slade, E. L. H. Yee et al., "Poly(ethylene-co-tetrafluoroethylene)-Derived Radiation-Grafted Anion-Exchange Membrane with Properties Specifically Tailored for Application in Metal-Cation-Free Alkaline Polymer Electrolyte Fuel Cells", Chem Mater 19 (10), 2688 (2007)1_.

J. R. Varcoe and R. C. T. Slade, "An electron-beam-grafted ETFE alkaline anion-exchange membrane in metal-cation-free solid-state alkaline fuel cells", Electrochemistry Communications 8 (5), 839 (2006).

J. R. Varcoe, R. C. T. Slade, and E. Lam How Yee, "An alkaline polymer electrochemical interface: a breakthrough in application of alkaline anion-exchange membranes in fuel cells",Chemical Communications (13), 1428 (2006).

A. Verma and S. Basu, "Direct alkaline fuel cell for multiple liquid fuels: Anode electrode studies", Journal of Power Sources 174 (1), 180 (2007).

J. R. Varcoe and R. C. T. Slade, "Prospects for Alkaline Anion-Exchange Membranes in Low Temperature Fuel Cells", Fuel Cells 5 (2), 187 (2005).

M. Wada and S. Higashizaki, "A Highly Basic Triphenylphosphine, [2,4,6-(Me0)3C6H2]3P", Journal of the Chemical Society-Chemical Communications (7), 482 (1984).

Y. Wang, L. Li, L. Hu et al., "A feasibility analysis for alkaline membrane direct methanol fuel cell: thermodynamic disadvantages versus kinetic advantages", Electrochemistry Communications 5 (8), 662 (2003).

E. H. Yu and K. Scott, "Development of direct methanol alkaline fuel cells using anion exchange membranes", Journal of Power Sources 137 (2), 248 (2004).

E. H. Yu and K. Scott, "Direct methanol alkaline fuel cells with catalysed anion exchange membrane electrodes", Journal of Applied Electrochemistry 35 (1), 91 (2005).

Y. Xiong, J. Fang, Q. H. Zeng et al., "Preparation and characterization of cross-linked quaternized poly(vinyl alcohol) membranes for anion exchange membrane fuel cells", J Membrane Sci 311 (1-2), 319 (2008).

H. W. Zhang and Z. T. Zhou, "Alkaline Polymer Electrolyte Membranes fom Quaternized Poly(phthalazinone ether ketone) for Direct Methanol Fuel Cell", J Appl Polym Sci 110 (3), 1756 (2008).

Z. L. Zhou, et al., Journal of the American Chemical Society, 2006, 128, 12963-12972.

N. J. Robertson, et al., Journal of the American Chemical Society, 2010, 132, 3400-3404.

Alia, S. M., et al., (2010), Advanced Functional Materials, 20(21), 3742-3746.

Li, W., et al., (2010) International Journal of Hydrogen Energy, 35 (6), 2530-2538.

Li, W., et al. (2010), Carbon, 48(4), 995-1003.

Li, W., et al. (2010), Journal of Powersources, 195(9), 2534-2540.

Gu, S., et al. (2010), ChemSusChem, 3(5), 555-558.

HIGHLY BASIC IONOMERS AND MEMBRANES AND ANION/HYDROXIDE EXCHANGE FUEL CELLS COMPRISING THE IONOMERS AND MEMBRANES

CROSS REFERENCE TO RELATED APPLICATION

This application claims the benefit of U.S. Provisional Application Ser. No. 61/412,745 filed on Nov. 11, 2010; U.S. Provisional Application Ser. No. 61/414,878 filed on Nov. 17, 2010; U.S. Provisional Application Ser. No. 61/439,303 filed on Feb. 3, 2011, and U.S. Provisional Application Ser. No. 61/449,084 filed on Mar. 3, 2011, all of which are hereby incorporated by reference as if set forth fully herein.

BACKGROUND OF ILLUSTRATIVE EMBODIMENTS

A fuel cell is a device that converts the chemical energy of fuel and an oxidant directly into electricity without combustion. Fuel cells are considered superior to processes that involve the burning of fuels because fuel cells have higher conversion efficiency and in general produce little to no air pollutants.

The components of the fuel cell include electrodes that are catalytically activated for fuel (anode) and the oxidant (cathode), and one or more electrolytes that conduct ions between the electrodes, thereby producing electricity. The electrodes are incorporated with catalysts to increase the reaction rates such that the energy conversion can proceed at an acceptable rate.

Fuel cells use fuel in the form of hydrocarbons (such as alcohols and hydrocarbons including gasoline and diesel) or, more commonly, hydrogen. Fuel cells typically use oxidant that is in the form of oxygen in the air.

Unlike internal combustion engines, fuel cells are not limited by the Carnot cycle and thus, in principle, could reach higher efficiencies. With pure hydrogen as the fuel, fuel cells are also environmentally friendly. The combination of high efficiency, low environmental impact, and higher power density has been and will continue to be the driving force for active research in this area for a wide variety of applications such as transportation, residential power generation, and portable electronic applications. For portable electronic applications in particular, desirable features include high energy density (i.e., longer battery life) and compactness.

There are many types of fuel cells. One example is the polymer ion exchange membrane fuel cell (IEMFC), which further includes the proton exchange membrane fuel cell (PEMFC), the anion/hydroxide exchange membrane fuel cell (AEMFC/HEMFC), and the bipolar membrane fuel cell (BMFC). When methanol is used directly as the fuel in these types of cells, the fuel cell is often referred to as a direct methanol fuel cell (DMFC). For these fuel cell examples, the electrolyte is typically based on membranes made from charged polymers (ionomers).

For PEMFC and PEMFC-based DMFCs, protons are the mobile species that travel through the ionomer electrolyte from the anode toward the cathode. Nafion is an example of a robust ionomer commonly used in PEMFC and DMFC. Illustrative ionomers are described in U.S. Pat. No. 7,829,620, titled "Polymer-Zeolite Nanocomposite Membranes for Proton-Exchange-Membrane Fuel Cells," filed on Sep. 25, 2009, which is incorporated by reference herein in its entirety.

For AEMFC/HEMFC types of cells, a hydroxide ion species resulting from oxygen reduction at the cathode is the mobile species that travels through the ionomer electrolyte from the cathode toward the anode.

Anion/hydroxide exchange membrane fuel cells (AEMFCs/HEMFCs) have received increasing attention due to perceived advantages such as (a) more facile fuel oxidation and oxygen reduction in high pH media, (b) electro osmotic drag by OH− from cathode to anode, which not only reduces fuel crossover but also realizes anode drainage, and (c) elimination of the bi/carbonate contamination problem of traditional liquid alkaline fuel cells (AFCs) whose electrolyte contains free metal cations. See, e.g., C. Lamy, E. M. Belgsir, J. M. Leger, Journal of Applied Electrochemistry 31, 799 (2001); Y. Wang, L. Li, L. Hu et al., Electrochemistry Communications 5 (8), 662 (2003); J. R. Varcoe and R. C. T. Slade, Fuel Cells 5 (2), 187 (2005).

A suitable anion/hydroxide exchange ionomer will likely have three-phase boundaries at the electrodes, where catalysts, electrolyte and reactant can interact. Unfortunately, unlike high performance acidic Nafion ionomer for proton exchange membrane fuel cells (PEMFCs), comparable hydroxide exchange ionomer has not heretofore been available for AEMFCs/HEMFCs.

KOH or NaOH aqueous solution has sometimes been used in the electrodes as an exchange ionomer, which limits advantages of AEMFCs/HEMFCs over traditional AFCs. See, e.g., K. Matsuoka, Y. Iriyama, T. Abe et al., Journal of Power Sources 150, 27 (2005); E. H. Yu and K. Scott, Journal of Power Sources 137 (2), 248 (2004); E. Agel, J. Bouet, and J. F. Fauvarque, Journal of Power Sources 101 (2), 267 (2001); L. Li and Y. X. Wang, Journal of Membrane Science 262 (1-2), 1 (2005); C. Coutanceau, L. Demarconnay, C. Lamy et al., Journal of Power Sources 156 (1), 14 (2006). Non-ionic conductive PTFE has also been used as an ionomer, which does not provide OH− transfer in the electrode and thus does not perform satisfactorily. See, e.g., E. H. Yu and K. Scott, Journal of Applied Electrochemistry 35 (1), 91 (2005). Sometimes Nafion is used as an ionomer, which also restrains OH− transfer in the electrode dramatically and is thus it not satisfactory either. See, e.g., H. Y. Hou, G. Q. Sun, R. H. He et al., Journal of Power Sources 182 (1), 95 (2008); A. Verma and S. Basu, Journal of Power Sources 174 (1), 180 (2007).

One approach is to crosslink membrane polymers in an attempt to alter the ionic conductivity. Crosslinking of membrane polymers and its effect on ionic conductivity in both PEMs and HEMs have been reported. See Z. L. Zhou, R. N. Dominey, J. P. Rolland, B. W. Maynor, A. A. Pandya and J. M. DeSimone, Journal of the American Chemical Society, 2006, 128, 12963-12972; 12; N. J. Robertson, H. A. Kostalik, T. J. Clark, P. F. Mutolo, H. D. Abruna and G. W. Coates, Journal of the American Chemical Society, 2010, 132, 3400-3404. However, one of the undesirable effects of crosslinking the ionomer is that the membrane tends to become less flexible, sometime even brittle, due to the fixed polymer chains. It would be advantageous to provide a fuel cell in which crosslinking and flexibility are balanced.

Recently, an insoluble cross-linked di-amine quaternized polyvinyl benzyl electrochemical interface was prepared as an attempt to enhance HEMFC performance. See, e.g., J. R. Varcoe, R. C. T. Slade, and E. Lam How Yee, Chemical Communications (13), 1428 (2006); J. R. Varcoe and R. C. T. Slade, Electrochemistry Communications 8 (5), 839 (2006). This polymer is not a soluble ionomer, however, and cannot effectively build three-phase boundaries in electrodes. As a result, its performance in HEMFCs is still limited. In addition, its ionic conductivity and stability are also limited because of its quaternary ammonium hydroxide group. Also recently, a soluble alkaline ionomer, A3-solution produced by Tokuyama was reported; however, its chemical structure, preparation method, and material properties such as ionic conductivity, stability, and fuel cell performance, are unknown. See, e.g., H. Bunazawa and Y. Yamazaki, Journal of Power Sources 182 (1), 48 (2008).

SUMMARY OF ILLUSTRATIVE EMBODIMENTS

According to one aspect, a family of polymers capable of forming membranes having OH$^-$ ionic conductivity as well as desirable mechanical properties is presented. Such polymers have applications including, but not limited to, AEM/HEM fuel cells. The provided polymers typically carry a charge, and therefore may also be referred to herein as "ionomers". More specifically, the charge is preferably positive in the application of the provided polymers to AEMFCs/HEMFCs. More specifically, the ionomers are preferably charged positively.

According to another aspect, a soluble alkaline ionomer, tris(2,4,6-trimethoxyphenyl)phosphine based quaternary phosphonium polysulfone hydroxide (TPQPOH), is presented. An example of soluable alkaline ionomer according to certain embodiments as disclosed herein has been synthesized and applied to anion exchange membranes fuel cells (AEMFCs). The exemplary TPQPOH hydroxide exchange membrane exhibits suitable hydroxide conductivity along with advantageous alkaline and temperature stability for use in AEMFCs and potentially other applications, as reflected by data presented in the detailed description of preferred embodiments. Briefly, according to one embodiment, TPQPOH can be synthesized by chloromethylation and quaternary phosphorization two-step method. The TPQPOH contains quaternary phosphonium hydroxide functional group, and it not only provides OH$^-$ transfer but also has excellent solubility. Owing to the high basicity (pK$_b$: 2.8) and large molecular size, tris(2,4,6-trimethoxyphenyl)phosphine (TTMOPP), as the tertiary phosphine ligand, can provide the TPQPOH with extremely high ionic conductivity and excellent alkaline and temperature stability.

In one embodiment, a highly basic ionomer is provided according to the chemical formulation [M1(—B$^+$)$_x$]$_n$(OH$^-$)$_m$, wherein M1 is a repeat unit comprising an aromatic moiety or a plurality of such repeat units at least one of which comprises an aromatic moiety and B$^+$OH$^-$ is a highly basic functional group having a pK$_b$ of 0.2 or smaller.

In another embodiment, a highly basic ionomer is provided having a polymer backbone including aromatic moieties and a plurality of highly basic functional groups, B$^+$OH$^-$, having a pK$_b$ of between −2.0-2.0, the ionomer being represented by the scheme [M1(—B$^+$)$_x$]$_n$ (OH$^-$)$_m$ wherein x is preferably between approximately 0.1 and 2.0.

In certain embodiments, an ionomer is provided having an M3 configured linking M1 and B$^+$, wherein M3 is selected from —(CR'R")$_n$—, —Ar— (aromatic), and -substituted —Ar—, and wherein n is 1,2, or 3 and R' and R" are independently selected from H, a halogen, a short chain alkyl, and a halogenated short chain alkyl, or includes at least one quaternary X$^+$, where X is selected from P, As, and Sb, or S, Se and Te.

In certain specific embodiments, the highly basic functional group, B$^+$, can be represented by the scheme (R'R"R''') P$^+$, wherein one or more of R', R", and R''' is independently selected from an electron donating group, or wherein one or more of R', R", and R''' can be independently an unshared electron pair adjacent to X or an unshared electron pair adjacent to an unsaturated system adjacent to X, or wherein one or more of R', R", and R''' is independently selected from —OR, —OH, —NH$_2$, —NHR, —NR$_2$, —NHCOR, —OCOR, —SR, —SH, —R, —Br, and —I with R being selected from short chain alkyl or a phenyl, or wherein one or more of R', R", and R''' can independently be a group selected from Ar (aromatic) and an Ar further having electron donating substituents. Preferably, R' or R" or R''' can be (2,4,6-RO)$_3$Ph wherein R is selected from a short chain alkyl or allyl. The number of carbon atoms in a short chain alkyl preferably range from 1 to 20, more preferably from 1 to 10, and most preferably from 1 to 5. Heteroatoms such as Si can also be present in the R group. In certain embodiments, the ionomer may be selected from one or more of polysulfone, polystyrene, poly(ether sulfone), poly(ether sulfone)-cardo, poly(ether ketone), poly(ether ketone)-cardo, poly(ether ether ketone), poly(ether ether ketone ketone), poly(phthazinone ether sulfone ketone), polyetherimide, poly(vinylbenzyl chloride) and poly(phenylene oxide), and the polymer backbone of the ionomer can include a first repeat unit and a second repeat unit in approximately equal molar ratios.

In certain embodiments, ionomers are connected at one or more pairs of cross linked site in the polymer backbones. In specific embodiments, at least one pair of polymer backbones are linked by at least one —(B$^+$)$^-$ group, or at least one short chain alkyl.

Also disclosed herein are methods for making (tris(2,4,6-trimethoxyphenyl)phosphine)$_x$ based polysulfone hydroxide (TPQPOH-x) that, according to certain embodiments, comprise the steps of, first, dissolving chloromethylate polysulfone (PSf) in an inert solvent for a selected reaction time, and second, combining tris(2,4,6-trimethoxyphenyl)$_3$ phosphine (TTMOPP)$^+$Y$^-$ and chloromethylated polysulfone (CMPSf) in a polar, aprotic solvent under conditions leading to synthesis of (tris(2,4,6-trimethoxyphenyl)phosphine)$_x$ based polysulfone hydroxide, wherein Y$^-$ comprises a leaving group suitable for ion exchanges such as a halogen. Preferably, the molar ratio of chloromethylene groups to polysulfone monomers (degree of chloromethylation (DCM)) is measured by $^1$HNMR. Preferably, the aprotic solvent includes a nitrogen-containing solvent.

According to another embodiment, a method is provided of preparing a high quality anionic ionomer membrane through the use of a high boiling point solvent in combination with low curing temperature. Aprotic solvent also is nitrogen based. The solvent preferably has a boiling point of greater than 100° C., more preferably greater than 150° C., and most preferably greater than 200° C. The membrane comprises polysulfone based TPQPOH, ECL-PVBC-QPOH, or QPOH based on any of the commercially available polymers including polycarbonate (PC), poly(2,6-dimethyl-1,4-phenylene oxide) (PPO), polyetherimine (PEI), poly(ether sulfone) (PES), poly(phenylene sulfoxide) PPS, poly(ether ether ketone) (PEEK), polybenzimidazole (PBI), polyvinyl chloride (PVC). Preferably polysulfone based TPQPOH, ECL-PVBC-QPOH, and PPO.

In another embodiment, a method is provided for preparing quality anionic ionomer membrane through the use of a low temperature curing process. The curing process is preferably carried out at a temperature below 80° C., more preferably below 50° C., and most preferably at 30° C. The membrane preferably comprises TPQPOH.

In specific embodiments, polysulfone (PSf) can be chloromethylated in the presence of chloromethylating agents and under conditions leading to the synthesis of polysulfone methylene chloride, or the chloromethylation reaction time to achieve a predetermined DCM between 0 (0%) and 2 (200%).

In specific embodiments, TTMOPP and CMPSf can be combined at a molar ratio of TTMOPP to chloromethylene groups in CMPsf so that substantially all TTMOPP molecules are each linked to at most one polysulfone polymer chain, for example at a molar ratio equal to or greater than about 1 but less than about 2. In specific embodiments, TTMOPP and CMPSf are combined at a molar ratio of TTMOPP to the chloromethylene groups in CMPSf so that at least one pair of polysulfone polymer chains are linked to the same TTMOPP group, for example at a molar ratio between about 0.5 and about 0.95.

In specific embodiments, (tris(2,4,6-trimethoxyphenyl)phosphine)$_x$ based polysulfone hydroxide can be combined with a multi-halogenated short chain alkyl under conditions leading to short chain alkyls being linked to two or more TTMOPP groups. The number of carbon atoms in a short chain alkyl preferably range from 1 to 20, and more preferably from 1 to 10, and most preferably from 1 to 5. Heteroatoms such as Si can also be present in the R group.

According to another aspect, an anion/hydroxide exchange membrane is provided having a configuration and size suitable for use in a fuel cell and including an ionomer of suitable qualities, preferably a (tris(2,4,6-trimethoxyphenyl)phosphine)$_x$ based polysulfone hydroxide (TPQPOH), wherein x is between 0 and 2.

In specific embodiments, the membrane includes an ionomer wherein the molar ratio of TTMOPP groups (to one singe repeat unit) bound to each (PSf) monomer in TPQPOH is expressed as the quantity DCM, and wherein the quantity DCM is selected so that the ionic hydroxide conductivity of the membrane is greater than about 20 mS/cm and more preferably greater than about 40 mS/cm, and wherein the number of TTMOPP groups bound to two (PSf) ionomer chains in TPQPOH is $DCL_{Self}$ (DCL is defined as the percentage of the quaternary phosphonium group (containing three trimethyoxyl group) that crosslinking-reacted with the chloromethyl group), and wherein $DCL_{Self}$ is selected so that the degree of swelling is less than about 15%.

According to other embodiments, an anion/hydroxide exchange membrane fuel cell is provided including an ionomer of particular qualities, and preferably where the ionomer is a (tris(2,4,6-trimethoxyphenyl)phosphine)$_x$ based polysulfone hydroxide.

Applications of the materials and methods disclosed herein include hydroxide exchange membrane fuel cells (energy conversion). The pristine/cross-linked quaternary-phosphonium functionalized anion/hydroxide exchange ionomers and membranes disclosed herein can also, for example, be used in dialysis/electrodialysis; desalination of sea/brackish water; demineralization of water; ultra-pure water production; waste water treatment; concentration of electrolytes solution in food, drug, chemical, and biotechnology fields; electrolysis (e.g., chloro-alkali production and $H_2/O_2$ production); energy storage (e.g., super capacitors and redox batteries); sensors (e.g., pH/RH sensors); and in other applications where an anion-conductive ionomer is advantageous.

Also described herein are polymers that can be used as electrolyte material in HEM based fuel cells. These polymers preferably contain positively charged species covalently linked to the polymer backbone structure, which allows the use of anions (such as hydroxide) as the exchange species in a fuel cell. Illustrative examples of such polymers are described, for example, in PCT Publication No. US09/05553, titled "Anion/Hydroxide Exchange Fuel Cells Comprising Ionomers and Membranes", filed on Oct. 9, 2009, is incorporated by reference herein in its entirety; Gu et al., Quaternary Phosphonium-Based Polymers as Hydroxide Exchange Membranes, ChemSusChem 3(5): 555-558 (2010), incorporated herein by reference in its entirety; and Gu et al., Self-crosslinking for dimensionally stable and solvent-resistant quaternary phosphonium based hydroxide exchange membranes, Chem. Commun. 47, 2856-2858 (2011), incorporated herein by reference in its entirety.

Further described herein are embodiments of HEMFCs in which hydroxide anions are the charged species transported through the membrane during the fuel cell operation. In other embodiments, the HEM can be used to transport other anions (anion exchange membrane fuel cell, or AEMFC).

Also described are carbonate exchange membrane fuel cells, which use carbonate or bicarbonate anions. As described, this carbonate exchange membrane fuel cell can operate at much lower temperatures than molten carbonate fuel cells (MCFCs).

Further aspects and details and alternate combinations of the elements of embodiments of the disclosed invention(s) will be apparent from the following detailed description and are also within the scope and spirit of the invention as may be claimed herein or at a later time.

DETAILED DESCRIPTION OF ILLUSTRATIVE EMBODIMENTS

Figure 1:
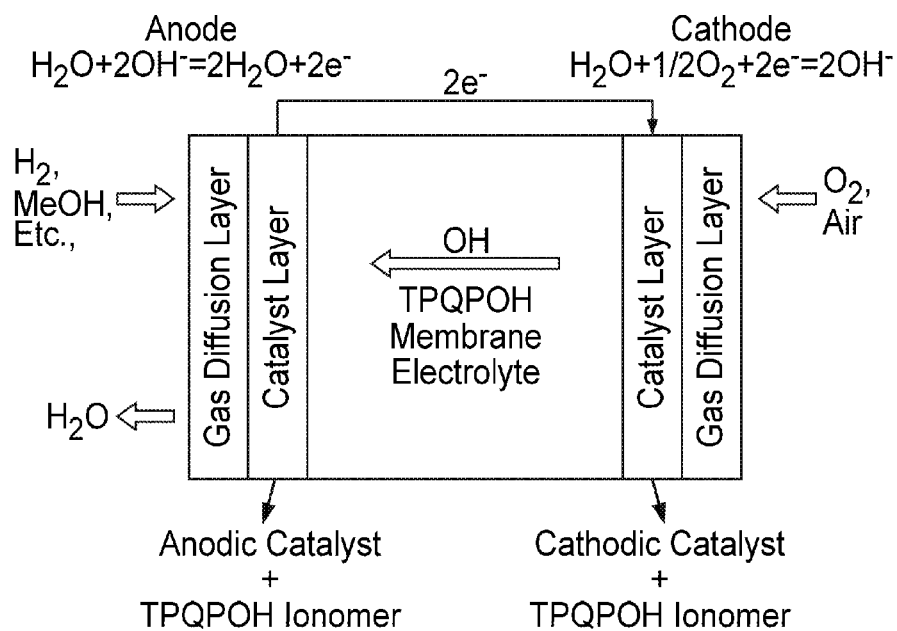
FIG. 1 illustrates an exemplary HEMFC fuel cell.

Initially, it is noted that headings are used herein for clarity only and without any intended limitation. A number of references are cited herein, the entire disclosures of which are incorporated herein, in their entirety, by reference for all purposes. Further, none of the cited references, regardless of how characterized above or elsewhere herein, is admitted as prior art to the invention of the subject matter claimed herein.

According to one aspect, a family of polymers is provided capable of forming membranes having exceptional OH$^-$ ionic conductivity as well as advantageous mechanical properties. In another aspect, membranes are provided including the provided polymers and AEMFC/HEMFC fuel cells including such membranes.

According to one or more embodiments, a soluble alkaline ionomer, tris(2,4,6-trimethoxyphenyl) phosphine based quaternary phosphonium polysulfone hydroxide (TPQPOH) is presented, and has been synthesized and used to prepare anion exchange membranes and fuel cells. The TPQPOH hydroxide exchange membrane has been discovered to have significantly high hydroxide conductivity along with advantageous alkaline and temperature stability. The following table makes apparent the surprising nature of the discovery.

TABLE 1

Comparison among polysulfones functionalized withthree types of quaternary phosphonium functional groups

| Quaternary phosphonium | Hydroxide conductivity (mS/cm @20° C., S = Siemens) | Stability in water |
|---|---|---|
| Bu$_3$P$^+$(DCM:[1] 130%) | 0.3 | Unstable |
| Ph$_3$P$^+$(DCM: 130%) | 1.0 | Stable |
| (2,4,6-MeO$_3$Ph)$_3$P$^+$ (TPQPOH, DCM: 124%-152%) | 27-45 | Extremely stable |

[1]"DCM" stands for degree of chloromethylation.

Advantageously, embodiments of an ionomer made according to principles described herein may exhibit hydroxide conductivity one to two orders of magnitude greater than the closely related alkyl and butyl and simple phenyl phosphonium functionalized ionomers (See Table 1).

In general, examples of TPQPOH may be synthesized by a chloromethylation and quaternary phosphorization two-step method. Differing from the commonplace quaternary ammonium hydroxide group, TPQPOH according to certain embodiments contains quaternary phosphonium hydroxide functional group, and it not only provides OH$^-$ transfer but also has excellent solubility. Owing to the high basicity (pK$_b$: 2.8) and large molecular size, tris(2,4,6-trimethoxyphenyl) phosphine (TTMOPP), as the tertiary phosphine ligand, provides the TPQPOH extremely high ionic conductivity and excellent alkaline and temperature stability.

Embodiments as disclosed herein are directed to a family of membrane-forming polymers that may exhibit exceptional OH$^-$ ionic conductivity and contain preferably highly basic groups. Membranes formed from the disclosed polymers may find applicability in many areas including but not limited to high-performance HEMFCs. Other applications include, for example, dialysis/electrodialysis; desalination of sea/brackish water; demineralization of water; ultra-pure water production; waste water treatment; concentration of electrolytes solution in food, drug, chemical, and biotechnology fields; electrolysis (e.g., chlor-alkali production and H$_2$/O$_2$ production); energy storage (e.g., super capacitors and redox batteries); sensors (e.g., pH/RH sensors); and in other applications where an anion-conductive ionomer is advantageous.

Fuel Cell Structure and Electrolyte Membranes

FIG. 1 illustrates a typical fuel cell with an anode portion (illustrated on the left) and a cathode portion (illustrated on the right) which are separated by an electrolyte; supporting members are not illustrated. The anode portion carries out an anode half-reaction which oxidizes fuel, thereby releasing electrons to an external circuit and producing oxidized products; the cathode portion carries out a cathode half-reaction which reduces an oxidizer, thereby consuming electrons from the external circuit. The gas diffusion layers (GDL) serve to deliver the fuel and oxidizer uniformly across the catalyst layer. Charge neutrality is maintained by a flow of ions from the anode to the cathode for positive ions and from cathode to anode for negative ions. The dimensions illustrated in FIG. 1 are merely for purposes of illustration and are not necessarily representative of the actual dimensions of a fuel cell, as the electrolyte membrane is usually selected to be as thin as possible consistent with membrane structural integrity.

In the case of the illustrated hydroxide exchange membrane fuel cell (HEMFC) in FIG. 1, the anode half-reaction consumes fuel and OH$^-$ ions and produces waste H$_2$O (also CO$_2$ in the case of carbon containing fuels); the cathode half reaction consumes O$_2$ and produces OH$^-$ ions; and OH$^-$ ions flow from the cathode to the anode through the electrolyte membrane. Fuels are limited only by the oxidizing ability of the anode catalyst, but typically can include H$_2$, MeOH, EtOH, ethylene glycol, glycerol, and similar compounds. Catalysts are usually Pt or based on Ag or one or more transition metals, e.g., Ni. In the case of a PEMFC, the anode half-reaction consumes fuel and produces H$^+$ ions and electrons; the cathode half reaction consumes O$_2$, H$^+$ ions, and electrons and produces waste H$_2$O; and H$^+$ ions (protons) which flow from the anode to the cathode through the electrolyte membrane. For such fuel cells, fuels are most commonly H$_2$ and MeOH.

It can, therefore, be appreciated how the electrolyte membrane is a key to fuel cell performance. First, high fuel cell efficiency requires low internal resistance, and therefore, electrolyte membranes with high ionic conductivity (low ionic resistance) are preferred. Second, high power requires high fuel cell currents, and therefore, electrolyte membranes with high ion-current carrying capacity are preferred. Also, practical electrolyte membranes should resist chemical degradation and be mechanically stable in the fuel cell environment, and also should not be unduly difficult to manufacture.

Polymers

In certain aspects, polymers and/or ionomers are provided, linked with basic functional groups, preferably highly basic groups that are generically described by Scheme 1 represented below.

Scheme 1

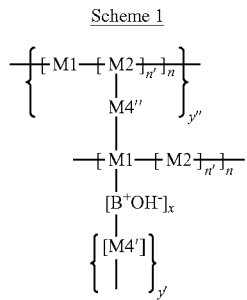

These polymers include repeating monomer unit, M1, with linked basic functional group, $B^+$. Preferably, the monomer unit polymerizes to form an aromatic polymer (e.g., by containing aromatic functionality) that is selected from one of polysulfone (PSf), polystyrene (PSt), poly(ether sulfone) (PES), poly(ether sulfone)-cardo (PESC), poly(ether ketone) (PEK), poly(ether ketone)-cardo (PEKC), poly(ether ether ketone) (PEEK), poly(ether ether ketone ketone) (PEEKK), poly(phthazinone, ether sulfone ketone) (PPESK), polyetherimide (PEI), Poly(phenylene oxide) (PPO), poly (vinylbenzyl chloride) (PVBC) and so forth.

In the above illustration, n is defined as the number of repeat units containing M1 and (multiple) M2 sections and can be between 10-10,000 (more preferably between 50-2000); n' is defined as the number of repeat units of M2 and can be between 0-100 (more preferably between 0-3); y" illustrates a polymer chain (i.e. top chain) that is crosslinked to the main chain (i.e. middle chain shown above in Scheme 1) via M1 or M2 without involving the B+ basic group. y' illustrates the group of the bridge for crosslinking via the $B^+$ basic group. Examples of crosslinking via the y' route are further illustrated in Scheme 5 (Self-crosslinking) and Scheme 7. Although multiple chain (y") or group (y') can be present in Scheme 1, only one chain (y") or group (y') has been illustrated in Scheme 1, because polymer structures after crosslinking are complex and difficult to draw. Thus, Scheme 1 is only for illustration and should not be viewed as limitations on the scope of the invention as claimed. It should be further understood that based on illustrative Scheme 5 and 6, researchers skilled in the art can easily visualize cross linking methods and arrive at crosslinked polymer structures that may seem different from what is illustrated in Scheme 1, but in fact are covered within the scope of this disclosure. M4" and M4' as shown in Scheme 1 is described below.

Advantageously, the polymer can be a copolymer as known in the art, for example a copolymer of M1 and a second monomer, M2, such as —(O)R—, —(O)Ar—, —CO(O)—, —SO(O)—, and so forth, as well as combinations of different monomers. Alternatively, M1 can be poly(vinylbenzyl chloride) (PVBC) in which case the M2 moiety is not necessary.

In another embodiment, a third single or repeating monomer (can be between 0-100 (more preferably between 0-3)) could be attached alongside M2 (which is linked to M1) according to Scheme 1 above. This version has not been illustrated. In yet another embodiment, other not shown single or repeating monomers (can be between 0-100 (more preferably between 0-3)) could be linked to this third monomer, and so forth. These third or fourth etc. monomers can be, but not limited to, —(O)R—, —(O)Ar—, —CO(O)—, —SO(O)—, and so forth. M2, and the possible third, fourth and subsequent monomers can be all independently selected from the aforementioned groups; and furthermore, these third, fourth and subsequent monomers can be present on both the polymer chain (i.e. [M1-[M2]n']n) that is crosslinked to the main chain or on the main chain itself.

The mol ratio of the basic group to the M1, x, is an adjustable parameter selected to give suitable properties in a particular application. Possible ratios depend on the chemistry of the attachment of $B^+$ to M1 as exemplified subsequently. Among possible ratios, a higher ratio is preferable as it leads to a higher ion exchange capacity (IEC), and a higher IEC is expected to lead to a higher ion-carrying capacity. However, a higher ratio can also lead to undesirable physical properties, such as excessive water absorption, swelling, and loss of mechanical stability. Generally, preferred ratios are between one-half and two, $0.5 \leq x \leq 2$. A particular possible ratio can be selected within this range by routine experimentation as described subsequently. The illustrated $OH^-$ group is the preferred anion for maintaining charge neutrality.

Also advantageously, the polymer can be cross-linked in order to improve mechanical stability, e.g., high dimensional stability, resistance to swelling in an aqueous or an organic solvent environment, hydroxide conductivity and thermal stability. Preferably, the degree of cross-linking is that which ensures minimum required mechanical stability, as excessive cross-linking can restrict the ionic conductivity of the subsequent membrane. Scheme 1 illustrates two exemplary techniques. In one exemplary embodiment illustrated by group y", the polymer chains themselves are cross-linked by a linker M4", which can be a functional group of M1 (M2) (or of the third monomer, fourth monomer etc.) or provided in a separate cross-linking reaction. In a preferred exemplary embodiment illustrated by group y', polymer chains are cross-linked through functional group $B^+$ by means of linker M4'.

Preferably in a "self-cross-linked" (SCL-) embodiment, M4' is another copy of linker M3 attached to an adjacent polymer chain. In a multi-halogenated hydrocarbon embodiment, M4' is a separate linker such as di- and tri-halogenated lower alkanes and alkenes and halogenated polymers for example, where the preferred halogen is chlorine. Examples include 1,2-dichloroethane, 1,2-dichloroethylene, 1,2-dichloropropane, 1,3-dichloropropane, 1,2,3-trichloropropane, 1,3-dichloropropene, and similar, and polyvinyl chloride (PVC), polyvinyl benzyl chloride (PVBC), and similar. Both embodiments of cross-linking are readily prepared since the three aromatic C(H)s on the TTMOPP have been found to be active nucleophiles.

In a preferred embodiment, M1 is polysulfone containing —OPhC(CH$_3$)$_2$Ph and —OPhSO(0)Ph repeat units and cross-linking, if present, is of the SCL type. This polymer is referred to herein simply as "polysulfone" (PSf).

Selection of the basic functional group can have a significant effect on performance. It is believed that, when formed into a membrane, the basic groups form a hospitable environment for $OH^-$ ions facilitating their transfer through the membrane. Corresponding, positive ions are relatively blocked by this environment. Basic groups believed to be particularly useful in preferred membranes have a pK$_b$ (in the environment of the particular polymer) of between −2.0-2.0. Highly preferred basic groups have a p$K_b$ of −2 or smaller. Specifically, preferred basic groups are generically described by Scheme 2, with more basic groups being more preferred.

Scheme 2

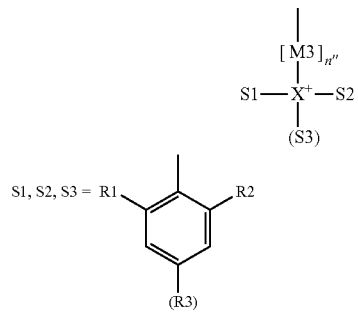

Generally, "( . . . )" denotes the enclosed group is optional. Here, M3 is a bridge chain between X$^+$ and the polymer backbone, which can be, for example, a short chain alkyl or halogenated alkyl or an aromatic or a substituted aromatic. Specifically, M3 can be —(CH$_2$)$_n$—, —(CR$_2$)$_n$—, —(CY$_2$)$_n$—, —Ar—, or -substituted Ar—, where n is preferably 1, 2, or 3 and Y is a halogen (F, Cl, Br, I); and the n" is defined as the number of repeat units of M3.

Both X and the substituents S1, S2, and (optionally) S3 (as shown in Scheme 2 above as (S3)) impact the basicity of B$^+$OH$^−$, and are advantageously chosen to have a p$K_b$ (in the environment of the particular polymer) of between −2.0-2.0 or close to this range, or highly preferably chosen to have a p$K_b$ of −2 or smaller. Specifically, preferred basic groups are generically described by Scheme 2, with more basic groups being more preferred.

Specifically, X is preferably selected from the elements of P, As, Sb, S, Se, Te, and similar, with P, As, and Sb being preferred and P being more preferred (at least because of its lower toxicity). X is preferably not the element of N. The substituents S1, S2, and (for the X=P, As or Sb) S3 can be the same or different but all should be electron donating, preferably strongly electron donating, as known in the art. Generally, preferred substituents have an unshared electron pair adjacent to X, such as —OR, —OH, —NH$_2$, —NHR, —NR$_2$, —NHCOR, —OCOR, —SR, —SH, —R, —Br, or —I where R is a short chain alkyl or allyl (i.e., have approximately six or less C) or a phenyl such as —CH$_3$, —(CH$_2$)$_n$—CH$_3$, -Ph with n=0, 1, 2. —R, —Br, or —I are less preferred. Preferred substituents can also have an unshared electron pair connected to an unsaturated system adjacent to X, such as —Ar or substituted —Ar where the substituents on Ar are also electron donating. In more preferred embodiments, S1, S2, and S3 can have the form illustrated at the left of Scheme 2. R1, R2, and (optionally) R3 (as shown in Scheme 2 above as (R3)) can also be the same or different but all should also be electron donating, preferably strongly electron donating, such as one or more of the electron-donating groups already listed.

The influence of the S1, S2, and S3 substituents are illustrated by Table 1, which lists certain properties of hydroxide ion conductivity and stability for standard electrolyte membranes from polymers having the indicated structures. In this table and subsequently, DCM=degree of chloromethylation, which, in the case of preferred polymers and as discussed subsequently, controls the mol ratio x of B$^+$ to M1 (and M2) discussed previously.

Here, -Bu is weakly electron donating; -Ph is only slightly more electron donating; while tris(2,4,6-trimethoxyphenyl)phosphine (2,4,6-MeO$_3$Ph) is strongly electron donating. Owing to the extremely high basicity (p$K_b$: 2.8) and large molecular size, tris(2,4,6-trimethoxyphenyl)phosphine (TT-MOPP) as the tertiary phosphine ligand provides the TPQPOH extremely high ionic conductivity and excellent alkaline and temperature stability.

In a preferred embodiment, B$^+$ takes the form of -(2,4,6-MeO$_3$Ph)$_3$P$^+$ and the polymer takes the form of PSf (polysulfone), either not cross-linked or self cross-linked. Specifically, a preferred polymer is (tris(2,4,6-trimethoxyphenyl)phosphine)$_x$ based polysulfone hydroxide (referred to in the following as TPQPOH-x or as TPQPOH-x*100%), a quaternary phosphonium where x is the mol ratio of the quaternary phosphonium groups to the polysulfone monomers. Preferably, 0.5≦x≦2.

An ionomer made in accordance with principled disclosed herein may exhibit hydroxide conductivity one to two orders of magnitude greater than alkyl and phenyl phosphonium functionalized ionomers.

TPQPOH may be synthesized by a chloromethylation and quaternary phosphorization two-step method. TPQPOH contains quaternary phosphonium hydroxide functional group, and not only provides OH$^−$ transfer but also has excellent solubility. Owing to the high basicity (p$K_b$: 2.8) and large molecular size, tris(2,4,6-trimethoxyphenyl)phosphine (TT-MOPP), as the tertiary phosphine ligand, provides the TPQPOH extremely high ionic conductivity and excellent alkaline and temperature stability.

In one embodiment, a highly basic ionomer is provided comprising [M1(-B$^+$)$_x$]$_n$(OH$^−$)$_m$, wherein M1 is a repeat unit comprising an aromatic moiety or a plurality of such repeat units at least one of which comprises an aromatic moiety and B$^+$OH$^−$ is a highly basic functional group having a p$K_b$ of 0.2 or smaller.

In another embodiment, a highly basic ionomer is provided having a polymer backbone including aromatic moieties and a plurality of highly basic functional groups, B$^+$OH$^−$, having a p$K_b$ of between −2.0-2.0, the ionomer being represented by the scheme [M1(-B$^+$)$_x$]$_n$(OH$^−$)$_m$ wherein x is preferably between approximately 0.1 and 2.0.

In certain embodiments, an ionomer made in accordance with the techniques described herein has an M3 configured linking M1 and B$^+$, wherein M3 is selected from —(CR'R")$_n$—, —Ar— (aromatic), and -substituted —Ar—, and wherein n is 1, 2, or 3 and wherein R' and R" are independently selected from H, a halogen, a short chain alkyl, and a halogenated short chain alkyl, or includes at least one quaternary X$^+$, where X is selected from P, As, and Sb, or S, Se and Te.

In specific embodiments, the highly basic functional group, B$^+$, can be represented by the scheme (R'R"R''')P$^+$, wherein one or more of R', R", and R''' is independently selected from an electron donating group, or wherein one or more of R', R", and R''' can be independently an unshared electron pair adjacent to X or an unshared electron pair adjacent to an unsaturated system adjacent to X, or wherein one or more of R', R", and R''' is independently selected from —OR, —OH, —NH$_2$, —NHR, —NR$_2$, —NHCOR, —OCOR, —SR, —SH, —R, —Br, and —I with R being selected from short chain alkyl or a phenyl, or wherein one or more of R', R", and R''' can independently be a group selected from Ar (aromatic) and an Ar further having electron donating substituents. Preferably, R' or R" or R''' can be (2,4,6-RO)$_3$Ph wherein R is selected from a short chain alkyl or allyl. The number of carbon atoms in a short chain alkyl preferably range from 1 to 20, more preferably from 1 to 10, and most preferably from 1 to 5. Heteroatoms such as Si can also be present in the R group.

In certain embodiments, the ionomer is selected from one or more of polysulfone, polystyrene, poly(ether sulfone), poly(ether sulfone)-cardo, poly(ether ketone), poly(ether ketone)-cardo, poly(ether ether ketone), poly(ether ether ketone ketone), poly(phthazinone ether sulfone ketone), polyetherimide, poly(vinylbenzyl chloride) and poly(phenylene oxide), and the polymer backbone of the ionomer can include a first repeat unit and a second repeat unit in approximately equal molar ratios.

Ionomers having one or more pairs of cross linked polymer backbones are also provided. In specific embodiments, at least one pair of polymer backbones are linked by at least one —(B$^+$)$^-$ group, or at least one short chain alkyl. The number of carbon atoms in a short chain alkyl can range from 1 to 20. Preferably 1 to 10, More preferably 1-5.

In another aspect, methods of making (tris(2,4,6-trimethoxyphenyl) phosphine)$_x$ based polysulfone hydroxide (TPQPOH-x) are disclosed that may, according to certain embodiments, comprise the steps of, first, dissolving chloromethylate polysulfone (PSf) in an inert solvent for a selected reaction time, and second, combining tris(2,4,6-trimethoxyphenyl)$_3$ phosphine (TTMOPP)$^+$Y$^-$ and chloromethylated polysulfone (CMPSf) in a polar, aprotic solvent under conditions leading to synthesis of (tris(2,4,6-trimethoxyphenyl)phosphine)$_x$ based polysulfone hydroxide, wherein Y comprises a leaving group suitable for ion exchanges such as a halogen. Preferably, the molar ratio of chloromethylene groups to polysulfone monomers (degree of chloromethylation (DCM)) is measured by $^1$HNMR. Preferably, the aprotic solvent is a nitrogen-containing solvent.

A method of preparing a high quality anionic ionomer membrane is also provided, through the use of a high boiling point solvent, low temperature curing process, and the use of nitrogen containing solvent. The solvent preferably has a boiling point of greater than 100° C., more preferably greater than 150° C., and most preferably greater than 200° C. The membrane can include polysulfone based TPQPOH, ECL-PVBC-QPOH, or QPOH based on any of the commercial polumers including polycarbonate (PC), poly(2,6-dimethyl-1,4-phenylene oxide) (PPO), polyetherimine (PEI), poly (ether sulfone) (PES), poly(phenylene sulfoxide) PPS, poly (ether ether ketone) (PEEK), polybenzimidazole (PBI), polyvinyl chloride (PVC). Preferably the ionomer membrane can polysulfone based TPQPOH, ECL-PVBC-QPOH, and/or PPO.

A certain embodiment may provide a method of preparing a high quality anionic ionomer membrane is further provided, through the use of a low temperature curing process. The curing process is preferably carried out at a temperature below 80° C., more preferably below 50° C., and most preferably below 30° C. The membrane preferably comprises TPQPOH.

In specific embodiments, a polysulfone (PSf) can be chloromethylated in the presence of chloromethylating agents and under conditions leading to the synthesis of polysulfone methylene chloride to achieve a preferred DCM between 0 (0%) and 2 (200%).

In specific embodiments, TTMOPP and CMPSf can be combined at a molar ratio of TTMOPP to chloromethylene groups in CMPsf so that substantially all TTMOPP molecules are each linked to at most one polysulfone polymer chain, for example, at a molar ratio equal to or greater than about 1 but less than about 2. In specific embodiments, TTMOPP and CMPSf are combined at a molar ratio of TTMOPP to the chloromethylene groups in CMPSf so that at least one pair of polysulfone polymer chains are linked to the same TTMOPP group, for example at a molar ratio between about 0.5 and about 0.95.

In specific embodiments, (tris(2,4,6-trimethoxyphenyl) phosphine)$_x$ based polysulfone hydroxide can be combined with a multi-halogenated short chain alkyl under conditions leading to short chain alkyls being linked to two or more TTMOPP groups. The number of carbon atoms in a short chain alkyl preferably range from 1 to 20, more preferably from 1 to 10, and most preferably from 1 to 5.

An anion/hydroxide exchange membrane may be configured and sized for use in a fuel cell, and may include an ionomer of a type disclosed herein, preferably a (tris(2,4,6-trimethoxyphenyl)phosphine)$_x$ based polysulfone hydroxide (TPQPOH), wherein x is between 0 and 2.

In specific embodiments, the membrane includes an ionomer wherein the molar ratio of TTMOPP groups (to one singe repeat unit) bound to each (PSf) monomer in TPQPOH is DCM, and wherein DCM is selected so that the ionic hydroxide conductivity of the membrane is greater than about 20 mS/cm and more preferrably greater than about 40 mS/cm, and wherein the number of TTMOPP groups bound to two (PSf) ionomer chains in TPQPOH is DCL$_{Self}$ and wherein DCL$_{Self}$ (as previously defined) is selected so that the degree of swelling is less than about 15%.

An anion/hydroxide exchange membrane fuel cell is also provided, including an ionomer as disclosed herein, and preferably where the ionomer is a (tris(2,4,6-trimethoxyphenyl) phosphine)$_x$ based polysulfone hydroxide, ECL-PVBC-QPOH, or QPOH based on any of the commercial polymers including polycarbonate (PC), poly(2,6-dimethyl-1,4-phenylene oxide) (PPO), polyetherimine (PEI), poly(ether sulfone) (PES), poly(phenylene sulfoxide) PPS, poly(ether ether ketone) (PEEK), polybenzimidazole (PBI), polyvinyl chloride (PVC). Preferably polysulfone based TPQPOH, ECL-PVBC-QPOH, and PPO.

Applications of the materials and methods disclosed herein may include hydroxide exchange membrane fuel cells (energy conversion). The pristine/cross-linked quaternary-phosphonium functionalized anion/hydroxide exchange ionomers and membranes disclosed herein can be used, for example, in dialysis/electrodialysis; desalination of sea/brackish water; demineralization of water; ultra-pure water production; waste water treatment; concentration of electrolytes solution in food, drug, chemical, and biotechnology fields; electrolysis (e.g., chloro-alkali production and H$_2$/O$_2$ production); energy storage (e.g., super capacitors and redox batteries); sensors (e.g., pH/RH sensors); and in other applications where an anion-conductive ionomer is advantageous.

Further information relating to the novel polymers and ionomers disclosed herein may also be found in Gu, S., Cai, R., Luo, T., Chen, Z., Sun, M., Liu, Y., et al. (2009). Angewandte Chemie—International Edition, 48(35), 6499-6502; Alia, S. M., Zhang, G., Kisailus, D., Li, D., Gu, S., Jensen, K., et al. (2010). Advanced Functional Materials, 20(21), 3742-3746; Li, W., Xin, Q., & Yan, Y. (2010). International Journal of Hydrogen Energy, 35(6), 2530-2538; Li, W., Waje, M., Chen, Z., Larsen, P., & Yan, Y. (2010). Carbon, 48(4), 995-1003; Li, W., Chen, Z., Xu, L., & Yan, Y. (2010). Journal of Powersources. 195(9), 2534-2540; and Gu, S., Cai, R., Luo, T., Jensen, K., Contreras, C., & Yan, Y. (2010). ChemSusChem, 3(5), 555-558; Gu, S., and Yan, Y, Chem. Commun. (2011). 47, 2856-2858; each of which is hereby incorporated by reference as if set forth fully herein.

EXAMPLES

Characterization Methods 1.1.1. NMR Spectroscropy

A Varian Inova 500 was used as the spectrometer at a resonance frequency of 500.059 MHz to obtain high-resolution $^1$H NMR and $^{31}$P NMR spectra.

1.1.1.1. Degree of Chloromethylation (DCM) by $^1$H NMR Spectroscopy: Dilute CMPSf solutions were prepared in deuterated chloroform (CDCl$_3$) with tetramethylsilane (TMS) as the internal standard. The DCM of CMPSf was calculated using the following equation (Eq. 1):

$$DCM = \frac{2A_{H_c}}{A_{H_d}} \times 100\%, \quad (1)$$

where, $A_{He}$ and $A_{Hd}$ are the integrated areas of the H$_e$ (the protons in —CH$_2$Cl) and the H$_d$ (the protons in the aromatic ring adjacent to the —SO$_2$— group) in the $^1$H NMR spectrum. CMPSf with DCM of x % is denoted as CMPSfx %. See, e.g., V. Cozan and E. Avram, European Polymer Journal 39 (1), 107 (2003).

1.1.1.2. Degree of conversion of chloromethylated group in TPQPCl by $^{31}$P NMR: $^{31}$P NMR spectra was recorded by the same instrument as $^1$H-NMR (solvent: DMSO-d6; external standard: 85% H$_3$PO$_4$) Before quaternary-phosphorization, $^{31}$P atom in pure TTMPP has a strong and single-peak at −65.6 ppm of chemical shift (DMSO-d6 as solvent, and 85% H$_3$PO$_4$ as external standard).

1.1.1.3. Degree of Cross Linking (DCL) by $^1$H NMR Spectroscopy: Degree of Crosslinking can be categorized into two types: Self Crosslink (SCL-) and Ex-Situ Crosslink (ECL-). For simplicity, the Degree of Crosslink (DCL) is used generically to refer to both types of crosslinking. However it should be recognized that calculation DCL for SCL- and ECL have slightly different calculation methods.

In the case of SCL-type, the charged functional group moiety can accommodate reacting and attaching to more than one polymer during the synthesis process. SCL- is normally a one step, one batch process that occurs at the same time the ionomer is being synthesized. 'Self cross-linked' embodiment is illustrated in Scheme 2 and discussed in detailed embodiments, as well as in the following section. See 'Preparation of self-cross linked TPQPOH(SCL-TPQPOH)'.

In the case of ECL-, crosslinking distinct polymer chaings having charged functional group is achieved by using a chemical linker which can bridge the connection between charged functional groups or between polymer backbones, or the combination of thereto if using more than one ECL-type. Embodiments of ECL- can be found in discussion surrounding Scheme 2 as well as in the following section. See 'ECL-PVBC-QPOH'.

For the spectra of TTMPP, TPQPOH, un-crosslinked PVBC-QPOH, a dilute solution (~5 mg) was prepared directly in deuterated dimethyl sulfoxide (DMSO-d6, 0.7 ml) containing small amount of tetramethylsilane (TMS) as the internal standard.

For the spectra of cross-linked ionomer samples, the above procedure is slightly modified because of the one effects crosslinking is solvent resistance. Larger amounts of material was immersed in to increase the polymer concentration, so as to obtain clear and reliable $^1$H NMR signals. The conditions for SCL-TPQPOHs and ECL-PVBC-QPOH are ~50 mg in 0.7 ml DMSO-d6 at 40° C. for one month and 10 mg in 0.7 ml DMSO-d6 at 40° C. for two weeks, respectively.

DCL can also be defined as the average percentage of the quaternary phosphonium group containing three trimethoxyl phenyl rings that crosslinked with the chloromethyl groups of ex-situ crosslinker 4,4'-bis(chloromethyl)-1,1'-biphenyl (CMBP). When trimethoxyl benzene ring is crosslinked by CMBP, the chemical shift for aromatic-H located in trimethoxyl benzene rings will switch from 6.04-6.34 ppm to 5.76-5.88 ppm, as seen in Figure ECL1.

Generally, the Measured Degree of In-Situ (otherwise referred to as selfcrosslinking) and Ex-Situ Crosslinking (DCL$_{Ex}$) obtained through $^1$H-NMR could be calculated from the equation below (Eq. 2):

$$DCL_{Ex} = \frac{6A(H)^c}{A(H)^u + 2A(H)^c} \times 100\% \quad (2)$$

Where $A(H)^c$ and $A(H)^u$ are integral areas of proton chemical shift peaks for trimethoxyl phenyl ring which is crosslinked (ppm: from 5.76 to 5.88) and uncrosslinked (ppm: from 6.04 to 6.34), respectively.

Measured Degree of Crosslinking (DCL$_m$) is the measured value of degree of crosslinking by employing 1H NMR spectroscopy. DCL$_n$, will be either DCL$_{Self}$ or DCL$_{Ex}$ if only one type of crosslinker is used in the ionomer, if any.

HC-Ionic conductivity (or Hydroxide Conductivity in the case of HEM applications) in the longitudinal direction was measured by a four-electrode method using AC impedance spectroscopy under water immersion. A conductivity cell was made from two platinum foils carrying the current and two platinum wires sensing the potential drop. The impedance measurements were carried out using an impedance/phase gain analyzer (Solartron SI 1260) and a potentiostat (Solartron SI 1287) over the frequency range from 1 Hz to 100 kHz. All the membrane samples were thoroughly washed and immersed in DI water for at least 12 h before testing. The conductivity of the membrane was calculated using the equation (Eq. 4):

$$\sigma = \frac{L}{WdR}, \quad (4)$$

where σ is ionic conductivity, L is distance between the two reference electrodes, W and d are width and thickness of membrane sample, respectively, and R is resistance of the membrane derived from the right-side intersect of semi-circle on the complex impedance plane with the Re(Z) axis.

Water uptake and Swelling ratio of Membranes: Membrane samples were immersed in deionized water at different temperatures for 48 h to insure the membranes were saturated with water. The liquid water on the surface of wet membranes was removed quickly with filter paper, and then the weight and dimensional lengths of wet membranes were measured. The weights and lengths of dry membranes were obtained after the wet membranes were dried for 48 h at 40° C. The water uptake and swelling ratio were calculated by the following equations (Eq. 5 & Eq. 6):

$$\text{Water uptake} = \frac{W_{wet} - W_{dry}}{W_{dry}} \times 100\%, \quad (5)$$

$$\text{Swelling ratio} = \frac{l_{wet} - l_{dry}}{l_{dry}} \times 100\%, \quad (6)$$

where $W_{wet}$ and $W_{dry}$ are the weights of wet and dry membrane samples respectively; $l_{wet}$ and $l_{dry}$ are the average length ($l_{wet} = (l_{wet1} \times l_{wet2})^{1/2}$, $l_{dry} = (l_{dry1} \times l_{dry2})^{1/2}$) of wet and dry samples, respectively, and where, $l_{wet1}$, $l_{wet2}$, and $l_{dry1}$, $l_{dry2}$ are the lengths and widths of wet membranes and dry membranes, respectively.

HC$_{IEC}$—IEC-Normalized Hydroxide Conductivity [Conductivity Normalized by the Number of Charged Functional Group]

Thermal Gravimetric Analysis (TGA) and Derivative Thermogravimetric Analysis (DTG) are done to characterize the thermal stability of the membranes. TGA and DTG (the one-order differential of TGA on temperature) is used to analyze the degradation weight-loss processes. Values such as the temperature at which the onset of thermal decomposition is observed ($T_{OD}$) and fastest weightloss temperature ($T_{FD}$) are recorded.

The subsequent sections describe the synthesis and properties of the embodiment.

1. TPQPOH-x and Self Cross-Linked TPQPOH-x (SCL-TPQPOH)

The three aromatic C(H)s on Tris(2,4,6-trimethoxyphenyl) phosphine (TTMOPP) have been found to be highly nucleophilic, and therefore, can readily react and be covalently linked with electrophiles such chloromethylated groups (CM). TTMOPP can, thus, readily link to polymers containing internal CM groups, and depending on stoichiometry, such polymers can also readily cross-link through the TTMOPP group.

Accordingly, TPQPOH-x has been synthesized by first chloromethylating polysulfone (PSf) to form the intermediate chloromethylated polysulfone (CMPSf), and second, adding TTMOPP to CMPSf. The addition can be controlled since the mol ratio of CM groups to PSf monomers in TPQPOH-x can be determined by $^1$HNMR.

2. Synthesis of Chloromethylated Polysulfone (CMPSf):
CMPSf was synthesized by chloromethylating polysulfone (PSf) (Sigma-Aldrich, Co. #182443, 374296, 428302) with paraformaldehyde and trimethylchlorosilane as chloromethylating agent and stannic chloride as catalyst, according to Scheme 3. See, e.g., E. Avram, E. Butuc, C. Luca, I. Druta, Journal of Macromolecular Science-Pure and Applied Chemistry A34, 1701(1997).

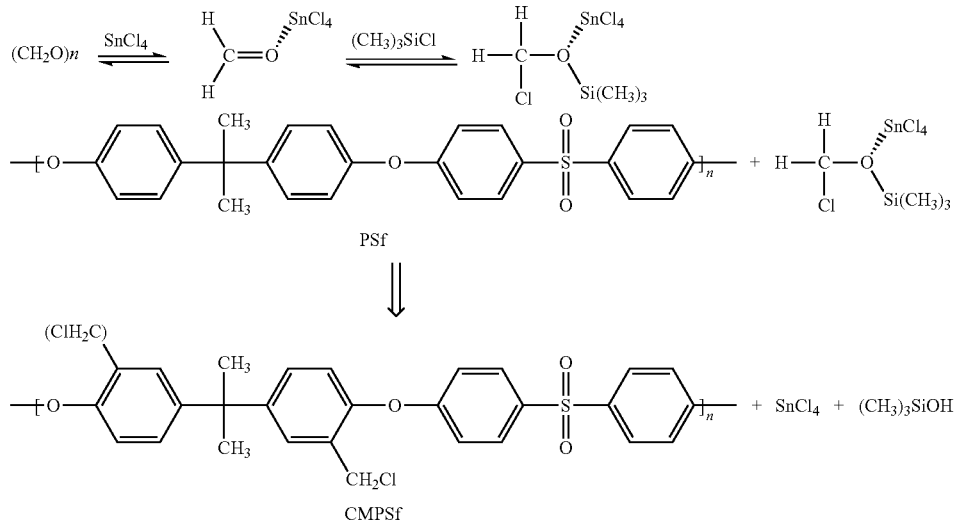

Scheme 3. Synthesis of Chloromethylated polysulfone (CMPSf)

Paraformaldehyde and trimethylchlorosilane (10 mol mol$^{-1}$ ratio to PSf for both) were added into PSf solution (2 g L$^{-1}$ in chloroform) in a flask equipped with a reflux condenser and magnetic stirring, followed by drop wise addition of stannic chloride (0.2 mol mol$^{-1}$ ratio to PSf). The reaction was kept at 50° C. using an oil bath for reaction times between 1 h. and 120 h. CMPSf with 1-200% of degree of chloromethylation (DCM) was synthesized depending on the reaction time.

Separation and purification of CMPSf was carried out by a precipitation method. The reaction mixture was poured into ethanol (95%) to end the reaction. White CMPSf immediately precipitated. The product was recovered by filtration from the ethanol, washed well with ethanol, and dried in vacuum at room temperature for 12 h.

1.1 Synthesis of tris(2,4,6-trimethoxyphenyl)phosphine based quaternary phosphonium polysulfone hydroxide (TPQPOH): Tris(2,4,6-trimethoxyphenyl) phosphine based quaternary phosphonium polysulfone chloride (TPQPCl) was synthesized by quaternary phosphorization of CMPSf with TTMOPP according to Scheme 4. CMPSf was dissolved in N,N-dimethylformamide (DMF) at 10 wt. %, followed by addition of TTMOPP (Sigma-Aldrich, Co. #392081) at a mol ratio of TTMOPP to the chloromethylated groups in CMPSf of approximately one (or from 95%, 97% or 99% to 105%, 110% or 120%). The quaternary phosphorization reaction was held at 80° C. for 12 h; the reaction mixture was poured into a Petri dish; and the DMF was evaporated at 40° C. for 2 d to obtain TPQPCl. TPQPOH was obtained by treating TPQPCl in 1 M KOH at room temperature for 48 h, followed by thorough washing and immersion in DI (deionized) water for 48 h to remove residual KOH.

Alternatively, the above synthesis can be carried out using 1-Methyl-2-pyrrolidone (NMP) as the solvent instead of DMF. The TPQPCl-containing mixture from the previous step was poured onto a silica wafer, followed by evaporating NMP at 30° C. for 12 hrs to obtain TPQPCl membrane. TPQPOH membrane was obtained by treating TPQPCl in 2 M KOH at room temperature for 48 hrs, followed by thorough washing and immersion in deionized water for 48 hrs to remove residual KOH. The typical thickness of prepared TPQPOH HEM is 50 or 100 μm.

The choice of solvents and curing temperature during the casting stage of the membrane formation affects the quality of the resulting membrane, as shown in Table 2.

TABLE 2

Membrane mechanical properties of TPQPCl152 under different preparation procedures.
The choice of solvents and curing temperature affects the resulting membrane quality

| Solvent | Membrane characteristics at curing temperature | |
|---|---|---|
| | 30° C. | 40-80° C. |
| Ethanol | Self-cracked, highly-brittle | Self-cracked, highly-brittle |
| N,N-dimethylmethanamide (DMF) | Self-cracked, brittle | Self-cracked, brittle |
| 1-Methyl-2-pyrrolidone (NMP) | Tough, non-brittle | Brittle |

[1]TPQPCl sample having 152% chloromethylation tested

If the reaction is allowed to go to substantial completion, the number of phosphonium groups bound to each polysulfone monomer is approximately equal to the DCM of the CMPSf.

1.2 $^{31}$P NMR confirmed that the degree of conversion of chloromethylated group in TPQPCl was close to 100%: Before quaternary-phosphorization, $^{31}$P atom in pure TTMPP has a strong and single-peak at −65.6 ppm of chemical shift (DMSO-d6 as solvent, and 85% $H_3PO_4$ as external standard); After the quaternary-phosphorization, the $^{31}$P atom in TPQPOH152 has a peak at +5.7 ppm, and leaves a trace signal at the original place (−65.6 ppm). These results confirm clearly TPQPOH has been successfully synthesized, and also the trace signal left at −65.6 indicates that the degree of quaternary-phosphorization would be close to 100%.

Scheme 4. Synthesis of TPQPOH

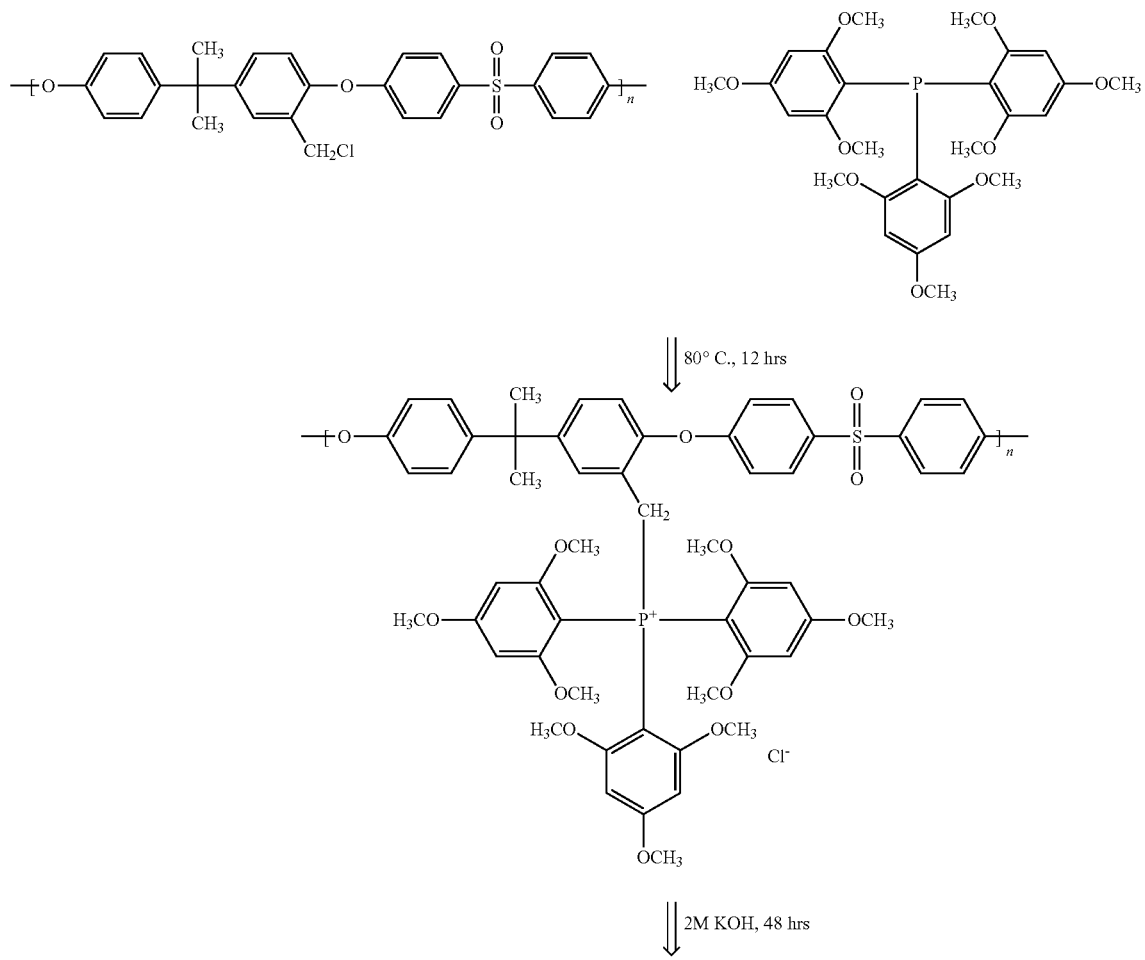

-continued
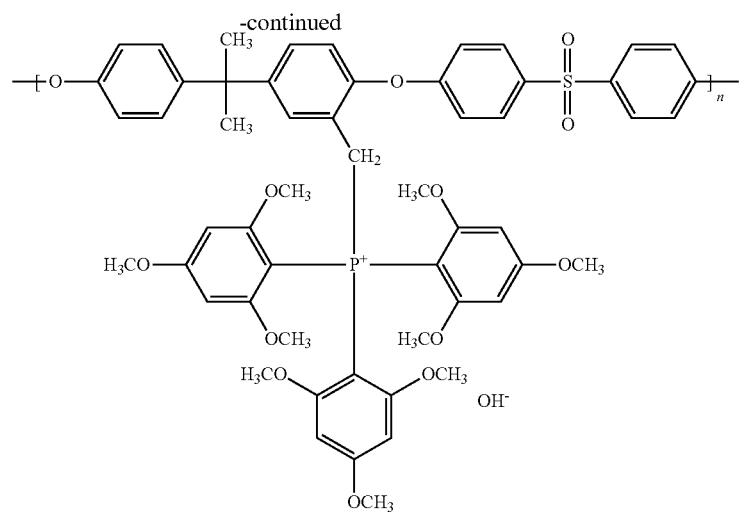
1.3 Preparation of self-cross linked TPQPOH(SCL-TPQPOH): The quaternary phosphorization and self-crosslinking were achieved by a simple one-step method. The self-cross linking embodiment is shown in Scheme 5.
Scheme 5. Self-cross linking of TPQPCl
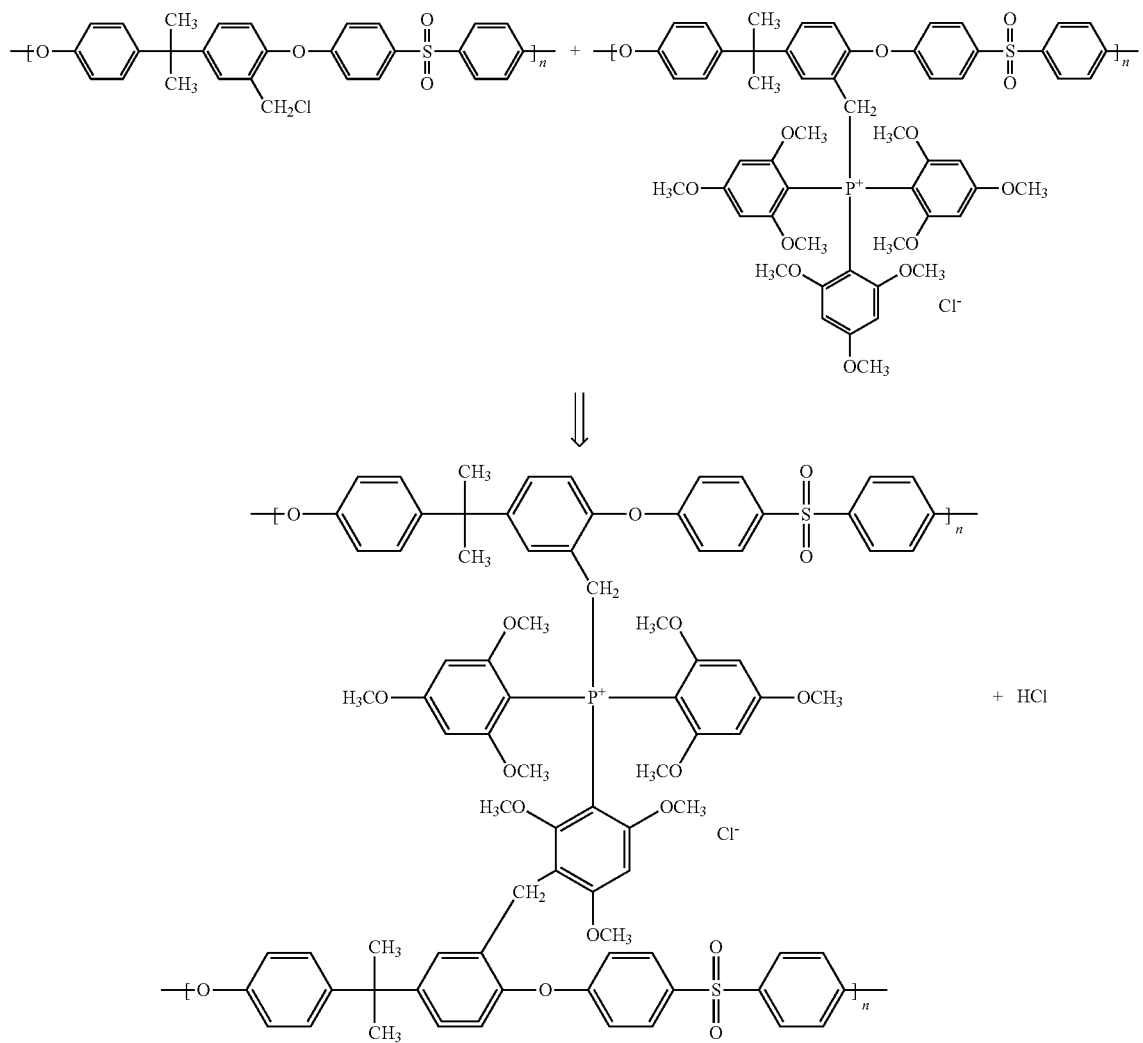

Self-cross linked Tris(2,4,6-trimethoxyphenyl)phosphine based quaternary phosphonium polysulfone chloride (SCL-TPQPCl) was synthesized by quaternary phosphorization of CMPSf with TTMOPP exactly as for unlinked TPQPOH except that the mol ratio of TTMOPP to the chloromethylated groups in CMPSf was varied in the range from 60% (or 40% or 50%) to 95% (or 96% or 98%). Lower mol ratios leads to a greater degree of cross-linking as then each TTMOPP group is likely to become linked by more than one to the chloromethylated group from different polymer chains. At higher mol ratios, the degree of cross-linking is less as then each chloromethylated group is likely to become linked to at most one TTMOPP moiety.

If the reaction is allowed to go to substantial completion, the number of phosphonium groups bound to each polysulfone monomer is approximately equal to the DCM of the CMPSf but a certain number of TTMOPP groups are expected to be bound to at least two separate ionomer chains thereby cross-linking the two ionomer chains. This average number of doubly-linked TTMOPP groups is expected to be on average approximately the mol ratio of the chloromethylated groups in CMPSf to TTMOPP minus one (but not less than 0). Accordingly, the latter number, the mol ratio of the chloromethylated groups in CMPSf to TTMOPP minus one (but not less than 0) is referred to herein as the degree of self-cross linking ($DCL_{Self}$).

In other words, control of degree of self crosslinking can be achieved by adjusting the molar proportion of TTMPP added to the CMPSf (i.e., the ratio of TTMPP to CM, or TTMPP:CM). When the TTMPP:CM ratio exactly equals 1, e.g., 0.991 g or 1.86 mmol TTMPP is added, the uncrosslinked TPQPOH186 is prepared. However, when the TTMPP:CM ratio is less than 1 (i.e., CM is in excess), the CM reacts first with TTMPP to form quaternary phosphonium groups preferentially owing to the much higher reactivity of quaternary phosphorization. Then, the residual CM will react with the quaternary phosphonium groups just formed, leading to the SCL-TPQPOHs. Here, 0.941 g or 1.77 mmol TTMPP (TTMPP:CM=0.95) formed SCL-TPQPOH5.3%. 5.3% is the degree of crosslinking, or DCL. It is defined as the average percentage of the quaternary phosphonium group (containing three trimethoxyl benzene rings) that crosslinked with the chloromethyl groups. Similarly, 0.891 g or 1.67 mmol TTMPP or TTMPP:CM=0.90, leads to CL-TPQPOH11%, 0.793 g or 1.49 mmol TTMPP, or TTMPP:CM=0.80 for SCL-TPQPOH25%, and 0.594 g or 1.12 mmol TTMPP, or TTMPP:CM=0.60 for SCL-TPQPOH67% (see also Table 12).

3. Preparation of TPQPOH membranes: TPQPOH membranes for the tests described herein were prepared by, first, preparing TPQPCl membranes by casting TPQPCl in DMF on a glass plate and then curing and drying at 40° C. for 1-2 days. TPQPCl membranes (thickness: 100-150 μm) were obtained by peeling off on the glass plate in deionized (DI) water. Then, TPQPOH membranes were prepared by treating TPQPCl membranes in 1 M KOH at room temperature for 48 h, followed by thorough washing and immersion in DI water for 48 h to remove residual KOH.

Alternatively, TPQPCl synthesis can be carried out using 1-Methyl-2-pyrrolidone (NMP) instead of DMF as the solvent. The TPQPCl-containing mixture from the prior step was poured onto a silica wafer, followed by evaporating NMP at 30° C. for 12 hrs to obtain TPQPCl membrane. TPQPOH membrane was obtained by treating TPQPCl in 2 M KOH at room temperature for 48 hrs, followed by thorough washing and immersion in deionized water for 48 hrs to remove residual KOH. The typical thickness of prepared TPQPOH HEM is 50 or 100 μm.

The use of high-boiling-point solvent of 1-methyl-2-pyrrolidone (NMP, bp=204° C.) and low-curing-temperature (30° C.) membrane-preparation procedure endows TPQPOH HEM with desired membrane properties, uniform in thickness, smooth, flexible and tough (e.g., it can easily sustain as high as 300 kPa of fuel cell back pressure without any gas-leakage) (Table 2). TPQPOH152 HEM has high alkaline-stability and long-term stability; it can maintain conductivity and flexibility after an immersion-treatment in 2 M KOH at 60° C. or 10 M KOH at room temperature for two days; or in 1 M KOH at 60° C. or 5 M KOH at room temperature for one month, while under similar conditions typical commercial QAOH functionalized FAA membranes would become very brittle, owing to the severe degradation. In addition, the polymer is inexpensive (~$2/m2 vs. Nafion's ~$900/m2) and its synthesis is simple, fast, and environmentally friendly, as summarized in (Table 3).

TABLE 3

Summary of synthesis-procedure for phosphorization

| Quaternary-reaction reagent[a] | Solid, non-volatile, Less toxic |
|---|---|
| Reactant ratio[b] | 1 |
| Reaction time | 12 h |
| Reaction temperature | 80° C. |
| Degree of conversion | 100% |

[a]Tris(2,4,6-trimethoxylphenyl)phosphine for phosphorization
[b]Reactant ratio: mole ratio of quaternary-reaction reagent to chloromethylated polymer 4. Preparation of membrane electrode assembly (MEA) with commercial anion exchange polymers: Commercial anion exchange membranes were also tested in the study, for example FT-FAA (Fuma-Tech GmbH). FT-FAA membrane had the following characteristics: thickness of 70 μm; ionic conductivity of 17 mS cm$^{-1}$ (millisiemens) in DI water at 20° C.; and ion exchange capacity of 1.6 mmol g$^{-1}$. Membrane electrode assemblies (MEA) with 5 cm$^2$ active area were prepared by pressing the anode, FAA commercial anion exchange membrane (OH$^-$ form) and cathode at 60° C. under 120 kgf/cm$^2$ for 5 min.

The MEA was assembled in a single cell fixture for the HEMFC test. After activation, the cell was discharged at constant current density from 0 to maximum current density in steps of 20 mA cm$^{-2}$ every 5 min. The I-V polarization curves were obtained under the operation conditions: pure H$_2$ and O$_2$ as fuel and oxidant, 0.2 L min$^{-1}$ and 250 kPa of flow rate and back pressure for both H$_2$ and O$_2$, the temperatures of anode and cathode humidifiers are 70° C. and 80° C., respectively, the cell temperature was kept at 50-80° C. accordingly.

5. Testing of TPQPOH and SCL-TPQPOH Membranes

This section first presents experimental data that have been measured for TPQPOH and for membranes of TPQPOH. It then further presents experimental data for fuel cells with TPQPOH membranes.

6. Properties of TPQPOH and of TPQPOH Membranes

7. Solubility of TPQPOH: Table 4 shows the solubility of TPQPOH in low-boiling-point water-soluble solvents at room temperature.

TABLE 4

Solubility of TPQPOH[a]

| Aqueous soluble solvent | Boiling point/° C. | 50 vol. % in Water | Pristine solvent |
|---|---|---|---|
| $H_2O$ | 100 | N/A | –[b] |
| MeOH | 64.7 | + | + |
| EtOH | 78.3 | + | + |
| PrOH | 97.2 | + | + |
| Acetone | 58.1 | +– | + |
| THF | 66.0 | + | – |
| Ethyl acetate | 77.1 | – | – |

[a]DCM of CMPSf: 124%
[b]80° C.
+: Soluble;
–: Insoluble;
+–: Partially soluble

It is apparent that TPQPOH is insoluble in water, even at 80° C., which permits its use in electrodes for water-based fuel cells without soluble loss.

Further, since low-boiling-point water-soluble solvents, e.g. EtOH and PrOH, are used for catalyst ink in fuel cell electrode preparation of electrode, due to the safety and efficiency, the solubility of ionomer in such solvents is an important requirement. It is also apparent that TPQPOH exhibits excellent solubility in MeOH, EtOH and PrOH in both 50 vol. % in water and pristine solvent at room temperature, which makes TPQPOH a useful soluble ionomer for fuel cell electrode preparation.

8. Water uptake and swelling ratio of TPQPOH membranes: Dimension stability of anion exchange membrane is important for practical use. Table 5 shows water uptake and swelling ratio of TPQPOH membranes with various DCMs in DI water at 20° C. and 60° C.

TABLE 5

Water uptake and swelling ratio of TPQPOH membranes

| | Water uptake/% | | Swelling ratio/% | |
|---|---|---|---|---|
| DCM/% | 20° C. | 60° C. | 20° C. | 60° C. |
| TPQPOH 75 | 25 | 35 | 9 | 14 |
| TPQPOH 99 | 41 | 71 | 12 | 20 |
| TPQPOH 124 | 70 | 145 | 21 | 34 |
| TPQPOH 152 | 137 | 255 | 33 | 48 |
| TPQPOH 178 | 798 | 2429 | 74 | 157 |

As expected, water uptake and swelling ratio increase with temperature and DCM. TPQPOH 124 membrane has 70% and 145% water uptake at 20° C. and 60° C., respectively, indicating good water absorption. At the same time, its swelling ratios are 21% and 34% at 20° C. and 60° C., respectively, indicating good dimension stability. Since TPQPOH 124 also has good ionic conductivity, as described subsequently TPQPOH 124 is a preferred material for hydroxide exchange membranes. Water uptake (swelling ratio) at 60° C. can be selected to be any value between about 35% (about 14%) and about 2429% (about 157%) by choosing a DCM between about 75 and about 178.

However, TPQPOH 178 has an excessive water uptake and swelling ratio, i.e., making the membrane's mechanical strength unacceptable.

9. Alkaline, temperature and time stability of TPQPOH membrane: Since the internal environment of HEMC fuel cells is alkaline, the alkaline stability of an ionomer and of the anion exchange membranes containing the ionomers are of practical importance. Table 6 shows alkaline stability of TPQPOH in different concentrations of KOH.

TABLE 6

Alkaline stability of TPQPOH 124 membrane after immersion at room temperature for 48 hrs

| Concentration of KOH/mol $L^{-1}$ | Color and morphology | Ionic conductivity/ mS $cm^{-1}$ |
|---|---|---|
| 1 | Slightly gold yellow, flexible | 27 |
| 2 | Slightly gold yellow, flexible | 26 |
| 5 | Slightly gold yellow, flexible | 29 |
| 10 | Slightly gold yellow, flexible | 32 |
| 15 | Yellow, brittle | Can't measure |
| 19.6 (saturated) | Deep yellow, very brittle | Can't measure |

It is apparent that TPQPOH doesn't lose ionic conductivity, even after being immersed in 10 M KOH solution (half saturated) at room temperature for 48 h, indicating excellent alkaline stability. Only KOH solution at 15 M and higher could turn TPQPOH a deep color and make TPQPOH membranes brittle.

Also, since elevated temperature can considerably improve fuel cell performance, temperature stability is also of practical importance. Table 7 shows temperature stability of TPQPOH-124 membrane.

TABLE 7

Temperature stability of TPQPOH 124 membrane after immersion of 48 hrs

| | Ionic conductivity/mS $cm^{-1}$ | |
|---|---|---|
| Temperature/° C. | DI water | 1M KOH |
| 20 | 27 | 27 |
| 60 | 26 | 27 |

It is apparent that TPQPOH doesn't lose ionic conductivity after being immersed in both DI water and even 1 M KOH at 60° C. for 48 h. Considering the highest usage temperature of current commercial anion exchange membrane is no more than 50-60° C., temperature stability of TPQPOH is excellent as both an ionomer and an anion exchange membrane.

The working life of an ionomer and anion exchange membrane depends on its time stability.

TABLE 8

Time stability of TPQPOH 124 membrane

| | Ionic conductivity/mS $cm^{-1}$ | |
|---|---|---|
| Time/d | DI water | 1M KOH |
| 0 | 27 | 27 |
| 30 | 27 | 28 |

From Table 8, it is also apparent that the ionic conductivity of TPQPOH-124 doesn't decrease after being immersed in DI water or 1 M KOH for 30 days, indicating excellent time stability.

10. Ionic conductivity of TPQPOH membrane compared to other membranes: High hydroxide-conductivity is one of the most important requirements of an HEM (hydroxide exchange membrane). Table 9 shows hydroxide conductivity of TPQPOH at room temperature.

TABLE 9

Ionic conductivity of TPQPOH membranes

| Sample | Ionic conductivity/ mS cm$^{-1}$ |
|---|---|
| TPQPOH 75% | 8 |
| TPQPOH 99% | 11 |
| TPQPOH 124% | 27 |
| TPQPOH 152% | 45 |
| TPQPOH 178% | 38 |
| FAA | 17 |
| Nafion112 | 84 |

It is apparent in Table 9 that TPQPOH exhibits excellent hydroxide conductivity. As expected, ionic conductivity of TPQPOH increases remarkably with DCM of CMPSf (although mechanical stability decreases concurrently). Hydroxide ionic conductivity of TPQPOH can be selected to be any value between about 8 mS/cm and about 45 mS/cm by choosing a DCM between about 75 and about 75%-178%.

In particular, TPQPOH152 exhibits the highest hydroxide-conductivity of among all currently known HEMs. Currently commercially available HEMs or HEMs reported by academic or industry labs are based on ionomers quaternary amines (QAOH) containing functional groups. Scheme 6 shows an exemplary QAOH functional group along with the quaternary phosphonium (QPOH) functional group of this invention.

Scheme 6. Chemical structures of an QAOH and the QPOH functional groups

QAOH:

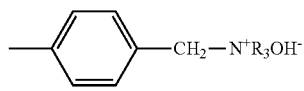

R: —CH$_3$, —CH$_2$CH$_2$OH, ...

QPOH:

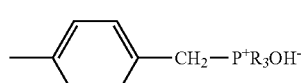

R:

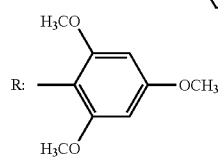

TPQPOH152 exhibits the highest hydroxide-conductivity of 45 mS cm$^{-1}$ (20° C.) among all known HEMs.

Figure 2:
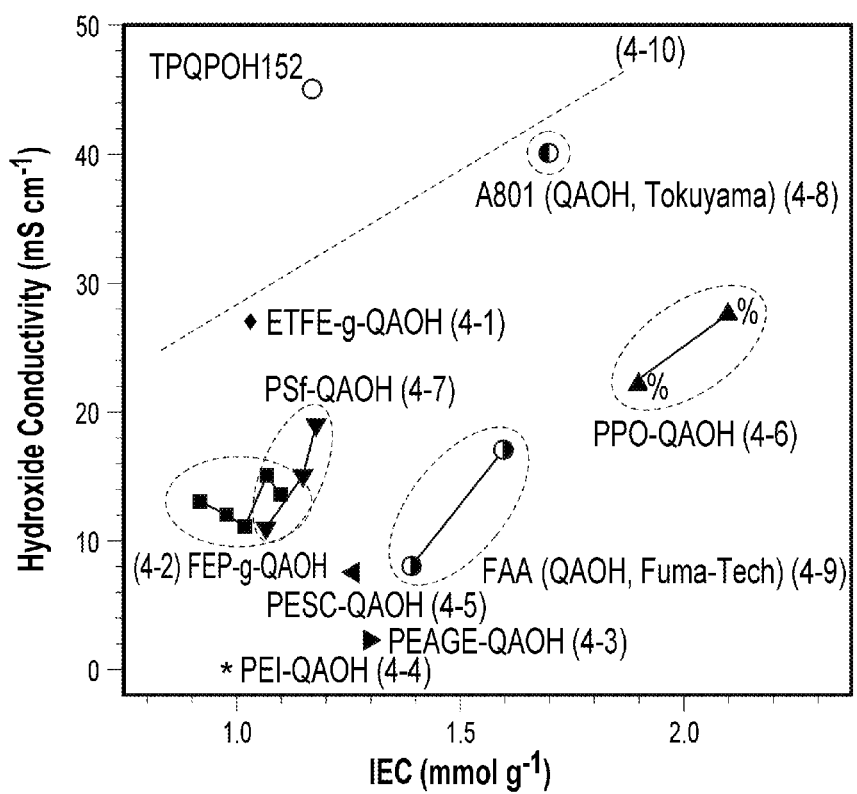
FIG. 2 illustrates hydroxide-conductivity vs. IEC at ~20° C. for TPQPOH152 and QAOH functionalized polymers immersed in deionized water.

FIG. 2 illustrates the hydroxide conductivity of several all current QAOH functionalized HEMs available commercially or reported by academic or industry labs plotted against their ion exchange capacity (IEC) (FIG. 2). Commonly higher conductivity is found at higher IEC, and this relationship is represented in FIG. 2 by line 4-10, which slopes upward toward increasing conductivities as the IEC increases.

Symbols for non-TPQPOH membranes used in FIG. 2

| electrolyte membrane polymer acronym | QAOH functionalized polymer name |
|---|---|
| ETFE-g-QAOH (♦) (4-1) | radiation-grafted poly(ethylene-co-terafluoroethylene) |
| FEP-g-QAOH (■) (4-2) | radiation-grafted poly(hexafluoropropylene-co-tetrafluoroethylene) |
| PEAGE-QAOH (▶) (4-3) | poly(epichlorhydrin-ally glycidyl ether) |
| PEI-QAOH (★) (4-4) | poly(ether imide) |
| PESC-QAOH (◀) (4-5) | poly(ethersulfone) cardo |
| PPO-QAOH (▲%) (4-6) | poly(2,6-dimethyl-1,4-phenylene oxide) |
| PSf-QAOH (▼) (4-7) | polysulfone |
| A801 (•) (4-8) | commercial HEM produced by Tokuyama Co. |
| FAA(●) (4-9) | commercial HEM produced by Fuma-Tech GmbH |

It can be seen that all known QAOH functionalized HEMs are located below line 4-10, while only the QPOH functionalized TPQPOH152 of this invention, as a surprising exception, is above the line. In other words, TPQPOH152 has high conductivity at an IEC at which QAOH functionalized HEMs have only much lower conductivities. To achieve conductivities closer to, but still less than, TPQPOH152, QAOH functionalized HEMs require significantly higher IECs which usually compromises mechanical stability membranes (e.g., by causing excessive solvent swelling).

More specifically TPQPOH152 has OH$^-$ conductivity 2.6 times that of commercial QAOH functionalized FAA (17 mS cm$^{-1}$, Fuma-Tech GmbH). It also has significantly higher conductivity than those QAOH functionalized HEMs (0.031-40 mS cm$^{-1}$) currently in the research sample stage. See, e.g., L. Li and Y. X. Wang, Journal of Membrane Science 262 (1-2), 1 (2005); R. C. T. Slade and J. R. Varcoe, Solid State Ionics 176 (5-6), 585 (2005); D. Stoica, L. Ogier, L. Akrour et al., Electrochim Acta 53 (4), 1596 (2007); J. R. Varcoe, R. C. T. Slade, E. L. H. Yee et al., Chem Mater 19 (10), 2686 (2007); S. F. Lu, J. Pan, A. B. Huang et al., P Natl Acad Sci Usa 105 (52), 20611 (2008); L. Wu, T. W. Xu, D. Wu et al., J Membrane Sci 310 (1-2), 577 (2008); G. G. Wang, Y. M. Weng, D. Chu et al., J Membrane Sci 326 (1), 4 (2009); J. Fang and P. K. Shen, J Membrane Sci 285 (1-2), 317 (2006); H. W. Zhang and Z. T. Zhou, J Appl Polym Sci 110 (3), 1756 (2008); Y. Xiong, J. Fang, Q. H. Zeng et al., J Membrane Sci 311 (1-2), 319 (2008); J. S. Park, S. H. Park, S. D. Yim et al., J Power Sources 178 (2), 620 (2008); Hiroyuki. Yanagi and Kenji Fukuta, ECS Trans 16 (2), 257 (2008).

It is also important to note that at similar IECs (1.17 mmol g$^{-1}$ for TPQPOH152 and 1.179 mmol g$^{-1}$ for PSf-QAOH) and with the same polymer matrix of polysulfone and similar homogeneous membrane structure, TPQPOH has a conductivity ca. 2.4 times of that (19 mS cm$^{-1}$) of PSf functionalized with QAOH, PSf-QAOH at 4-7. This difference is due to the substantially higher basicity of the QPOH functional group in TPQPOH152 in comparison to the QAOH function group in QAOH functionalized HEMs. Further the substantially higher basicity is believed to be due to the 2,4,6-trimethoxyphenyl groups in the QPOH which are very strong electron-donors in comparison to the methyl group, a weak electron donor, typically found in QAOH function groups. This higher basicity of TPQPOH152 is also consistent with its better alkaline stability, because the efficient decentralization of positive charge of phosphorus atom by the electron-donating triple 2,4,6-trimethoxyphenyl groups, enhances substantially and simultaneously the stability and basicity.

Interestingly, the ratio of hydroxide conductivity of TPQPOH152 to the proton conductivity of Nafion112 (84 mS cm$^{-1}$) is 0.54:1, which is close to 0.57:1 that is the ratio of the ion-mobility of the hydroxide to the proton (20.50 vs. 36.25 cm$^2$ V$^{-1}$ s$^{-1}$, 25° C.)). This implies that the hydroxide transport network likely to be created within TPQPOH152 is similarly efficient to the proton network within Nafion. See, e.g., D. Eisenberg and D. Crothers, Physical Chemistry with Applications to the Life Sciences, 1st ed. (Benjamin/Cummings Publishing Co., Menlo Park, Calif., 1979); T. D. Gierke, G. E. Munn, and F. C. Wilson, J Polym Sci Pol Phys 19 (11), 1687 (1981).

11. Properties of Fuel Cells With TPQPOH Membranes
12. Electrode preparation: Catalyst ink was prepared by mixing platinum black powder and TPQPOH ionomer in the presence of ethanol and DI water. Briefly, platinum black was well dispersed in DI water, followed by addition of 5 wt. % TPQPOH in a mixture of ethanol and DI water (50/50 wt./wt.), and then addition of an additional 1.5 g water and an additional 1.5 g anhydrous ethanol. Summarizing, the recipe used was 100 mg Pt; 0.5 g 5 wt. % TPQPOH in 50/50 EtOH/H$_2$O solution (25 mg TPQPOH); 1.5 g additional DI H$_2$O; and 1.5 g additional EtOH. The catalyst ink was kept for good dispersion in an ultra-sonicator at 0° C. for 1 h. Thus the ratio of Pt to TPQPOH was kept at 4/1 wt./wt.

The electrodes (both anode and cathode) were prepared by spraying the catalyst ink onto the commercial gas diffusion layer (GDL), (SGL, 25 cc) for certain Pt loadings, typically 0.2 and 0.5 mg Pt/cm$^2$.

Figure 3A:
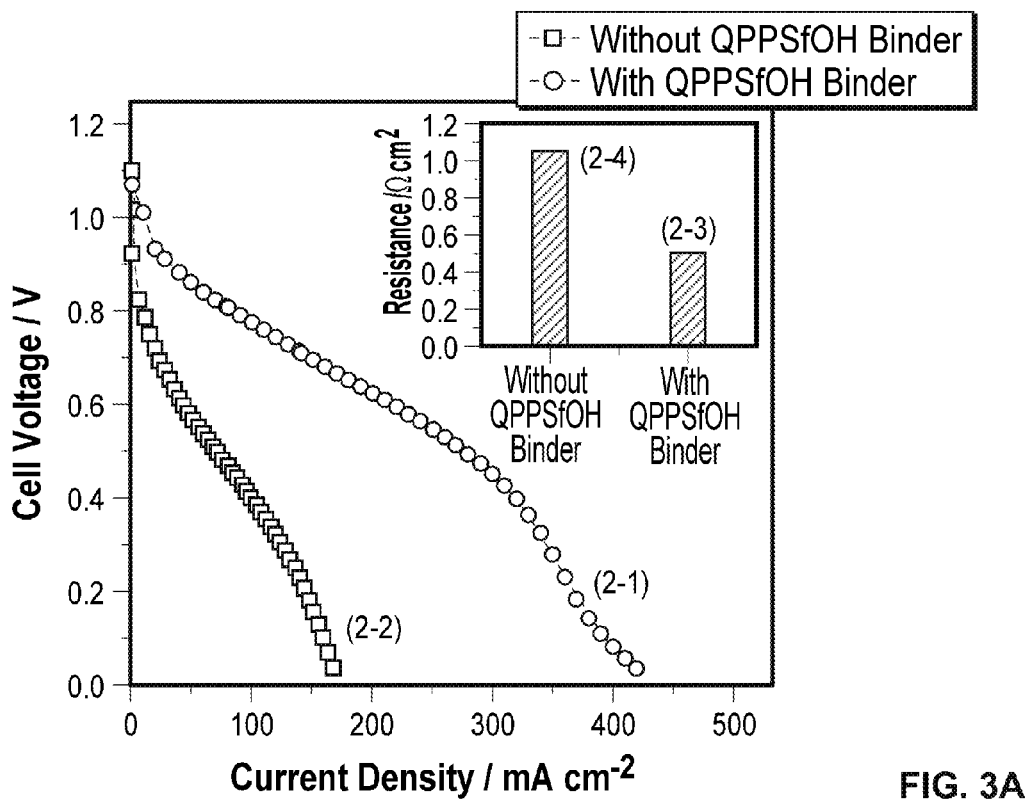
FIG. 3A illustrates polarization curves of HEMFC with (2-1) and without (2-2) TPQPOH ionomer. Inset: Resistances of MEA (membrane electrode assembly) of HEMFC with (2-3) and without (2-4) TPQPOH ionomer.

13. Comparison of HEMFC performance with and without TPQPOH ionomer in the catalyst layer: FIGS. 2A and 2B illustrate the comparison of HEMFC performance with and without TPQPOH ionomer in the catalyst layer. FIG. 3A illustrates polarization curves with electrode containing the same Pt catalyst loading of 0.2 mg/cm$^2$. TPQPOH adopted HEMFC clearly has a dramatically higher performance, with the maximum current density increasing from 168 to 420 mA/cm$^2$ (a factor of 2.5 increase). Only a minor change in the open circuit voltage (OCV) was observed (1.070 vs. 1.100 V), indicating that the TPQPOH ionomer did not affect the catalytic activity of Pt catalyst.

FIG. 3A inset illustrates the resistance of fuel cells with and without the TPQPOH ionomer. The resistance of TPQPOH adopted HEMFC reduces from 1.05 to 0.50 Ωcm$^2$, which indicates the TPQPOH ionomer can considerably improve the OH$^-$ transfer in the electrodes.

Figure 3B:
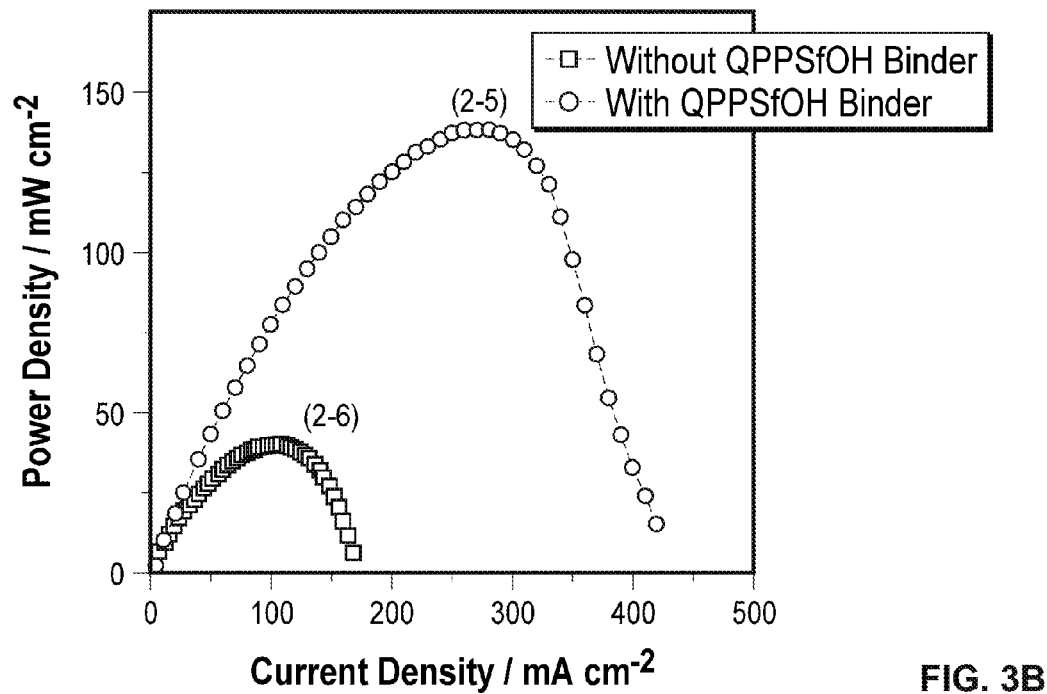
FIG. 3B illustrates power densities of HEMFC with (2-5) and without (2-6) TPQPOH ionomer.

FIG. 3B illustrates the power density with and without the TPQPOH ionomer. The maximum power density increases from 40 to 138 mW/cm$^2$ (a factor of 3.5 increase). To the best of the inventors' knowledge, this is the highest maximum power density among metal cation free HEMFCs.

The test conditions are as follows: FIGS. 2A-B: anode and cathode electrodes, respectively, 0.2 mg Pt (Pt black) cm$^{-2}$ and 0.05 mg TPQPOH cm$^{-2}$; cell temperature of 50° C.; H$_2$ and O$_2$ flows are humidified at temperatures of 70° C. and 80° C., respectively, at flow rates of 0.2 L min$^{-1}$, and at back pressures of 250 kPa; the electrolyte membranes are 70 μm thick FT-FAA (FuMA-Tech, GmbH);

In summary, the TPQPOH ionomer enhances HEMFC current density and power density and reduces internal resistance.

Figure 4A:
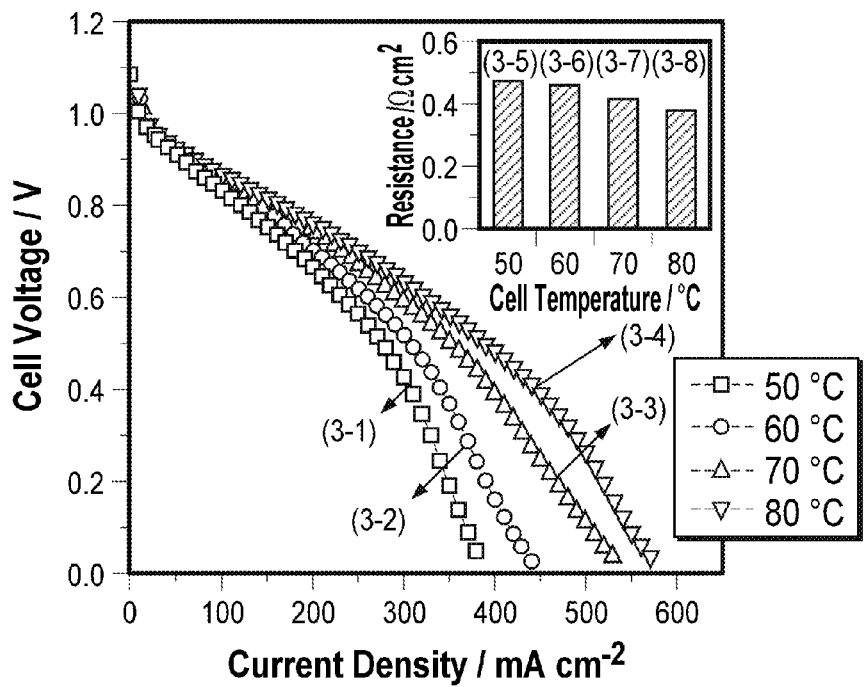
FIG. 4A illustrates polarization curves of HEMFC with TPQPOH ionomer at cell temperatures of 50° C. (3-1), 60° C. (3-2), 70° C. (3-3), 80° C. (3-4). Inset: Resistances of MEA of HEMFC with TPQPOH ionomer at cell temperatures of 50° C. (3-5), 60° C. (3-6), 70° C. (3-7), 80° C. (3-8)

14. Performance of TPQPOH adopted HEMFC at elevated temperature: FIGS. 3A-B illustrate HEMFC performance with TPQPOH ionomer in the catalyst layer at elevated temperatures. FIG. 4A illustrates polarization curves demonstrating that TPQPOH adopted HEMFC performance improves with increasing fuel cell temperature. The maximum current density increases from 380 mA/cm$^2$ at 50° C. to 570 mA/cm$^2$ at 80° C. (a factor 50% increase). The OCV of TPQPOH adopted HEMFC decreases slightly from 1.080 V at 50° C. to 1.060 V at 80° C. (largely due to the Nernst law).

FIG. 4A inset illustrates the internal resistance of TPQPOH adopted HEMFCs at elevated temperatures. The resistance of TPQPOH adopted HEMFC decreases from 0.48 Ωcm$^2$ at 50° C. to 0.38 Ωcm$^2$ at 80° C. (decreasing by about 20%). The OH$^-$ conduction of the TPQPOH ionomer in the hydroxide exchange membrane increases considerably with temperature.

Figure 4B:
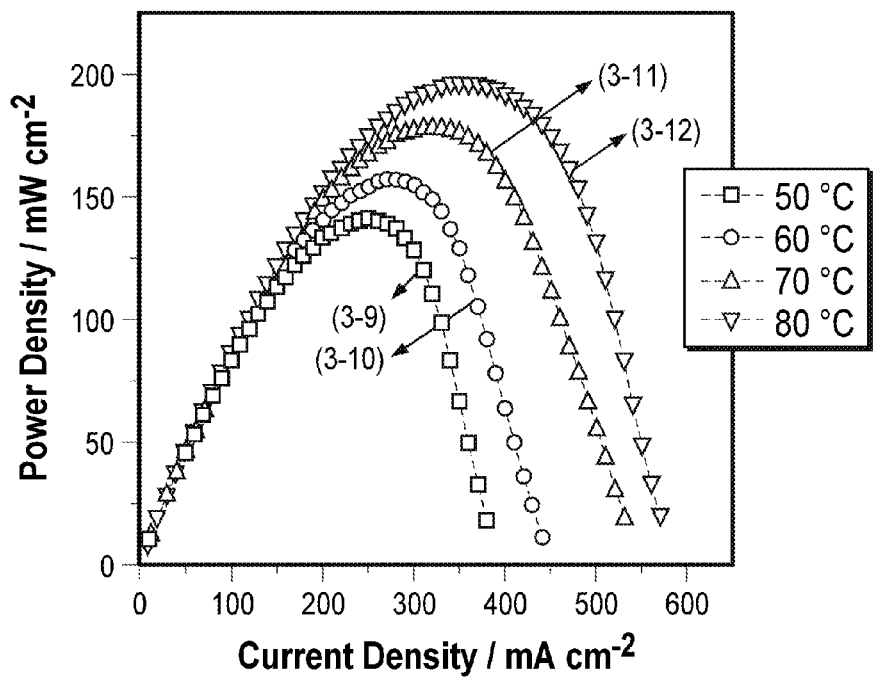
FIG. 4B illustrates power densities of HEMFC with TPQPOH ionomer at cell temperatures of 50° C. (3-9), 60° C. (3-10), 70° C. (3-11), 80° C. (3-12)

FIG. 4B illustrates the power density of TPQPOH adopted HEMFC at elevated temperatures. The maximum power density increases from 141 mW/cm$^2$ at 50° C. to 196 mW/cm$^2$ at 80° C. (increasing by about 40%).

Test conditions for FIGS. 3A-B are as follows: anode and cathode electrodes, respectively, 0.5 mg Pt (Pt black) cm$^{-2}$ and 0.125 mg TPQPOH cm$^{-2}$; cell temperatures of 50° C., 60° C., 70° C., and 80° C.; H$_2$ and O$_2$ flows are humidified at temperatures 70° C. and 80° C., respectively, at flow rates of 0.2 L min$^{-1}$, and at back pressures of 250 kPa; the electrolyte membranes are 70 μm thick FT-FAA;

These results clearly indicate that TPQPOH can perform better at higher elevated temperatures, e.g. 80° C.

Figure 5:
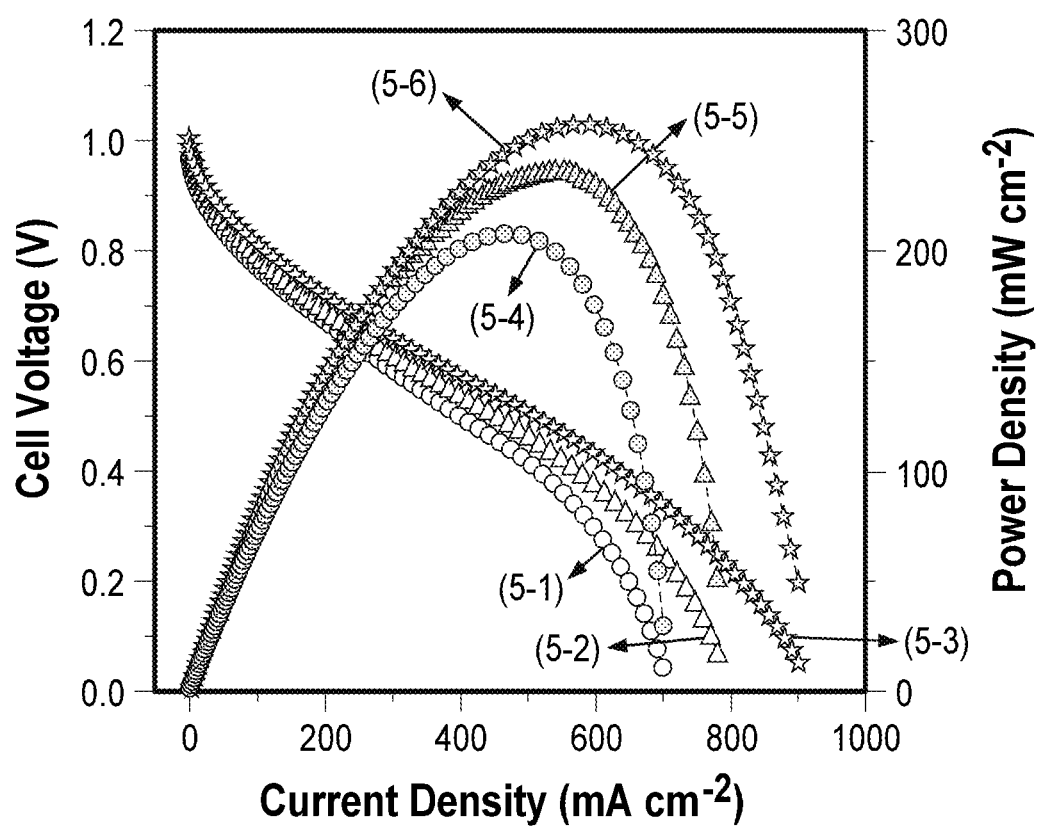
FIG. 5 illustrates polarization curves (open symbols) at cell temperatures of 50° C. (5-1), 60° C. (5-2), 70° C. (5-3) and power density (solid symbols) and at cell temperatures of 50° C. (5-4), 60° C. (5-5), 70° C. (5-6), both sets of curves being for a 50 μm TPQPOH152 HEM (hydroxide exchange membrane) incorporated HEMFC.

15. Comparison of fuel cell performance with TPQPOH membrane compared with other membranes: Although TPQPOH152 HEM has high hydroxide-conductivity and stability, probably due to an efficient hydroxide transport network, the performance of a HEMFC single cell test is the most powerful way to evaluate a novel HEM. FIG. 5 illustrates polarization curves for an H$_2$/O$_2$ HEMFC with a 50 μm TPQPOH152 HEM. It is apparent that the peak power density increases with cell temperature (207, 236 and 258 mW cm$^{-2}$ at 50, 60 and 70° C., respectively), while the measured internal resistance decreases with increasing cell temperature (0.225, 0.214 and 0.210 Ωcm$^2$ at 50, 60 and 70° C., respectively).

Figure 6:
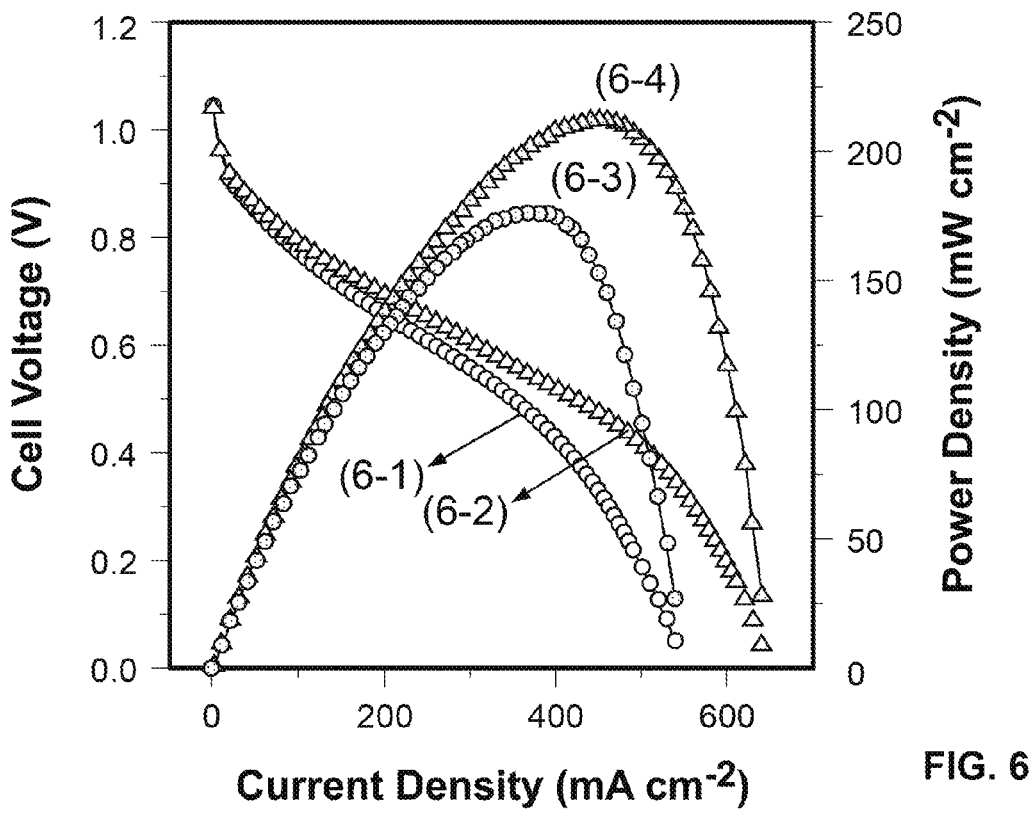
FIG. 6 illustrates polarization curves (open symbols) at cell temperatures of 50° C. (6-1) and 60° C. (6-2) and power density curves (solid symbols) and at cell temperatures of 50° C. (6-3) and 60° C. (6-4), both sets of curves being for a 100 μm TPQPOH152 HEM incorporated HEMFC.

Test conditions for FIG. 5 are as follows: anode and cathode electrodes, respectively, 0.2 mg Pt (Pt black) cm$^{-2}$ and 0.05 mg TPQPOH cm$^{-2}$; cell temperatures of 50° C., 60° C., 70° C.; H$_2$ and O$_2$ flows are humidified at temperatures of 70° C. and 80° C., respectively, at flow rates of 0.2 L min$^{-1}$, and at back pressures of 250 kPa; TPQPOH152 membrane thickness of 50 μm;

FIG. 6 illustrates results with a thicker (100 μm) TPQPOH152 incorporated HEMFC. The peak power densities were 176 and 202 mW cm$^{-2}$ and the internal resistances were 0.334 and 0.299 Ωcm$^2$ at 50 and 60° C., respectively.

Test conditions for FIG. 6 are as follows: anode and cathode electrodes, respectively, 0.2 mg Pt (Pt black) cm$^{-2}$ and 0.05 mg TPQPOH cm$^{-2}$; cell temperatures of 50° C. and 60° C.; H$_2$ and O$_2$ flows are humidified at temperatures 70° C. and 80° C., respectively, at flow rates of 0.2 L min$^{-1}$, and at back pressures of 250 kPa; TPQPOH152 membrane thickness of 100 μm;

Table 10 shows comparable results QAOH functionalized HEMs.

TABLE 10

Performance comparison of QPOH and QAOH functionalized HEMs incorporated HEMFCs

| HEM | Thickness (μm) | Ionomer | Catalyst and (loading, mg cm$^{-2}$) | Oxidant and (back pressure, kPa) | PPD$^a$, mW cm$^{-2}$ and (IR$^b$, Ωcm$^2$) at cell temperature | | |
|---|---|---|---|---|---|---|---|
| | | | | | 50° C. | 60° C. | 70° C. |
| TPQPOH152 | 50 | TPQPOH124 | Pt (0.2) | O$_2$ (250) | 207 (0.225) | 236 (0.214) | 258 (0.210) |
| | 100 | TPQPOH124 | Pt (0.2) | O$_2$ (250) | 176 (0.334) | 202 (0.299) | |
| FAA (QAOH) | 70 | TPQPOH124 | Pt (0.5) | O$_2$ (250) | 141 (0.48) | 157 (0.46) | 178 (0.42) |
| | 70 | None | Pt (0.2) | O$_2$ (250) | 40 (1.05) | | |
| ETFE-g-QAOH | 51 | PVBC-QAOH | PtRu (4.0)/Pt (4.0) | O$_2$ (0) | 130 (0.79) | | |
| | 51 | PVBC-QAOH | Pt (0.5) | O$_2$ (0) | 90 (1.0) | 110 (1.1) | |
| A801 (QAOH) | 17 | AS-4 (QAOH) | Pt (0.5) | Air (N/A) | 95 (N/A) | | |
| | 17 | A3Ver2 (QAOH) | Pt (0.5) | Air (N/A) | 22 (N/A) | | |
| PSf-QAOH | 50 | PSf-QAOH | Ni (5.0)/Ag (1.0) | O$_2$ (130) | | 50 (N/A) | |
| PSf-T/T-QAOH | 90 | PSf-T/T-QAOH | Pt (0.5)/Ag (2.0) | Air (0) | | 30.1 (1.5) | |
| | 90 | PSf-T/T-QAOH | Pt (0.5) | Air (0) | | 28.2 (2.3) | |
| NEOSEPTA (QAOH) | N/A | PSf-T/T-QAOH | Pt (0.5) | Air (0) | | 16.5 (N/A) | |

$^a$PPD, peak power density.
$^b$IR, internal resistance. See, e.g., J. R. Varcoe and R. C. T. Slade, Electrochemistry Communications 8 (5), 839 (2006); S. F. Lu, J. Pan, A. B. Huang et al., P Natl Acad Sci Usa 105 (52), 20611 (2008); J. S. Park, S. H. Park, S. D. Yim et al., J Power Sources 178 (2), 620 (2008); Hiroyuki. Yanagi and Kenji Fukuta, ECS Trans 16 (2), 257 (2008); S. Gu, R. Cai, T. Luo et al., Angew Chem Int Edit 48 (35), 6499 (2009); Jin-Soo Park, Gu-Gon Park, Seok-Hee Park et al., Macromol Symp 249-250 (1), 174 (2007).

With comparable membrane-thickness and lower catalyst loadings, the peak power density of TPQPOH152 incorporated HEMFC is 1.5-9.4 times that of QAOH functionalized HEM incorporated HEMFC, and its internal resistance is 13%-50% that of the QAOH fuel cells. In addition, the peak power density of 258 mW cm$^{-2}$ and the internal resistance of 0.210 Ωcm$^2$ are the highest and lowest values, respectively, among these HEMFCs.

Figure 7:
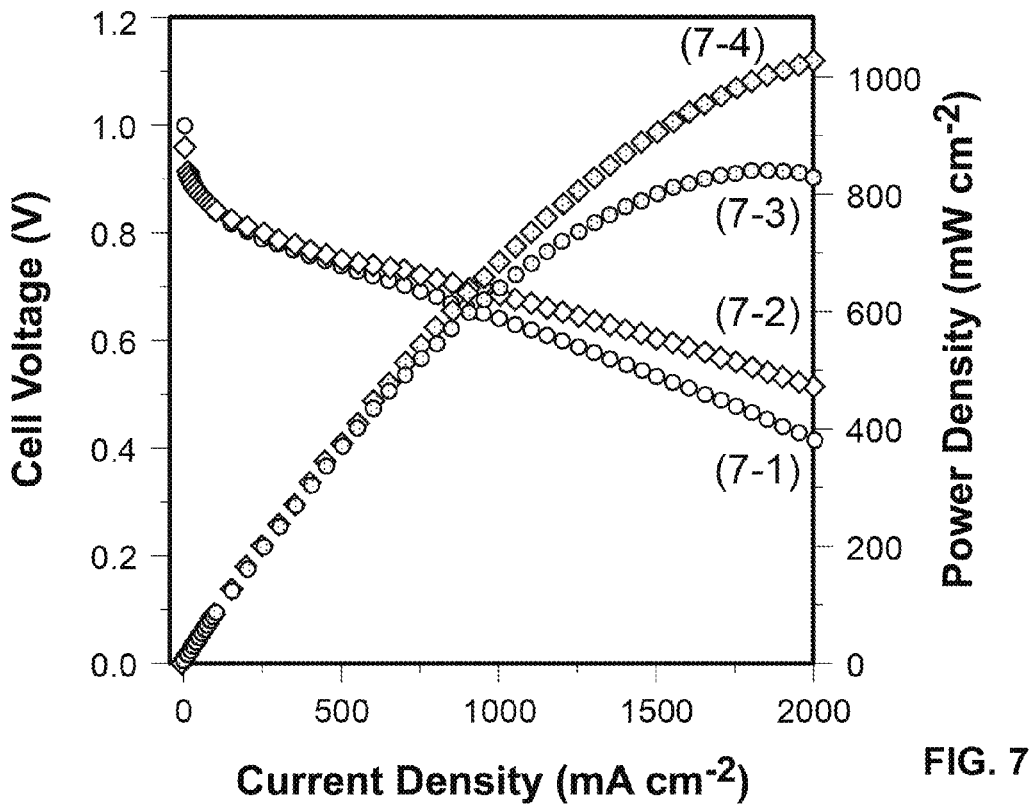
FIG. 7 illustrates polarization curves (open symbols) at cell temperatures of 50° C. (7-1) and 80° C. (7-2) and power density curves (solid symbols) and at cell temperatures of 50° C. (7-3) and 80° C. (7-4), both sets of curves being for a 50 μm Nafion212 PEM (proton exchange membrane) incorporated PEMFC.

Comparison of TPQPOH incorporated HEMFC and Nafion incorporated PEMFC: To benchmark HEMFCs against PEMFCs, a 50 μm Nafion212 membrane incorporated PEMFC fuel cell was tested under the conditions comparable to those of FIG. 7. The test condition for FIG. 7 are as follows: FIG. 7: anode and cathode electrodes, respectively, 0.2 mg Pt (Pt/C 20 wt %) cm$^{-2}$ and 0.54 mg Nafion212 cm$^{-2}$; cell temperatures of 50° C. and 80° C.; H$_2$ and O$_2$ flows are humidified at temperatures 70° C. and 80° C., respectively, at flow rates of 0.2 L min$^{-1}$, and at back pressures of 250 kPa; the electrolyte is 50 μm thick Nafion212;

Table 11 shows the comparison results.

TABLE 11

Performance comparison of HEMFC and PEMFC

| Fuel cell | Membrane | OCV (V) | PPD (mW cm$^{-2}$) | IR (Ω cm$^2$) | $i_o^a$ (A cm$^{-2}$) | $b^b$ (mV dec$^{-1}$) |
|---|---|---|---|---|---|---|
| HEMFC | TPQPOH152 | 1.015 | 207 | 0.225 | 1.5 × 10$^{-7}$ | 63 |
| PEMFC | Nafion212 | 0.998 | 838 | 0.096 | 1.8 × 10$^{-7}$ | 68 |

Membrane-thickness of 50 μm, cell temperature of 50° C., and catalyst loading of 0.2 mg Pt cm$^{-2}$.
$^a i_o$, apparent exchange current density.
$^b$Tafel slope.

The HEMFC has about a quarter of peak power density and 2.3 times of internal resistance of the PEMFC. A higher open circuit voltage, OCV (1.015 vs. 0.998 V), a similar apparent exchange current density, $i_o$ (1.5×10$^{-7}$ vs. 1.8×10$^7$ A cm$^{-2}$), and a lower Tafel slope (63 vs. 68 mV dec$^{-1}$) are also observed for HEMFC.

In the case of exchange current density, the geometric electrode area was used while the true electrochemical Pt surface area, which is known to be higher for the 20 wt. % Pt/C used for PEMFC than the Pt black used for HEMFC. Therefore, the true exchange current density could be much larger for HEMFC than for PEMFC. If so, the larger exchange current density and lower Tafel slope both suggest a better intrinsic electrocatalyst activity in HEMFCs than for PEMFCs.

Figure 8:
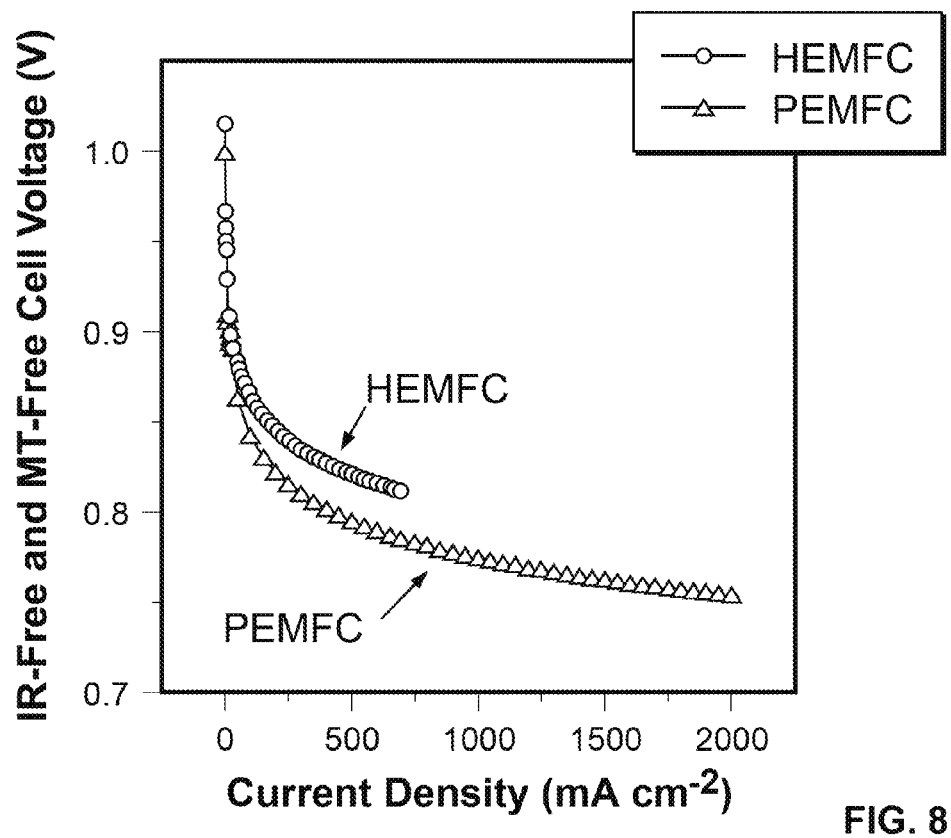
FIG. 8 illustrates comparison of IR-free (internal resistance) and MT-free (mass transport) cell voltage between TPQPOH152 HEM incorporated HEMFC and Nafion212 PEM incorporated PEMFC.
Figure 9:
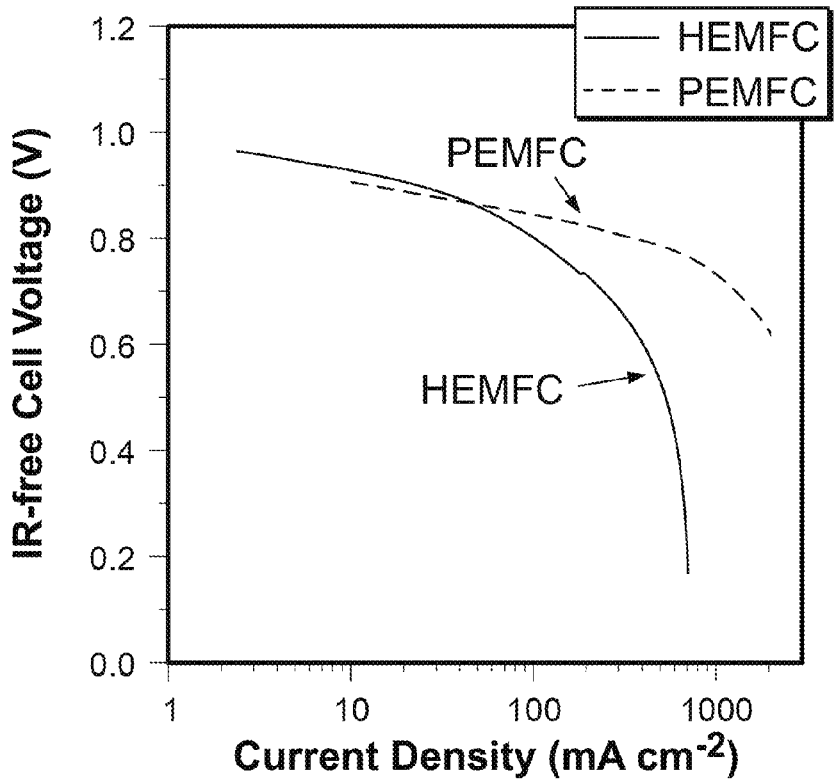
FIG. 9 illustrates comparison of IR-free cell voltage between TPQPOH152 HEM incorporated HEMFC and Nafion212 PEM incorporated PEMFC.

FIG. 8 illustrates that the IR-free (IR for internal resistance) and MT-free (MT for mass transport) cell voltage of HEMFC is clearly higher than that of PEMFC, providing further evidence that the catalysts in HEMFC are more active than in the PEMFC. Test conditions for FIG. 8 are as follows: anode and cathode electrodes, respectively, 0.2 mg Pt cm$^{-2}$ of Pt black for HEMFC (Pt black) and Pt/C 20 wt. % for PEMFC; cell temperature of 50° C.; H$_2$ and O$_2$ flows are at flow rates of 0.2 L min$^{-1}$, and at back pressures of 250 kPa; the electrolyte membranes are 50 μm TPQPOH152 for HEMFC and 50 μm Nafion212 for PEMFC;

FIG. 9 illustrates that the MT voltage loss of the HEMFC is larger than that of the PEMFC at middle-to-high current density range. This is likely due to the more demanding needs for water transport in a HEMFC, where water is both a product at the anode and a reactant at the cathode reaction, respectively. See, e.g., Jin-Soo Park, Gu-Gon Park, Seok-Hee Park et al., Macromol Symp 249-250 (1), 174 (2007). Test condition for FIG. 9 are as follows: anode and cathode electrodes, respectively, 0.2 mg cm$^{-2}$ of Pt black for HEMFC and Pt/C 20 wt. % for PEMFC; cell temperature of 50° C.; $H_2$ and $O_2$ flows are at flow rates of 0.2 L min$^{-1}$, and at back pressures of 250 kPa.

Figure 10:
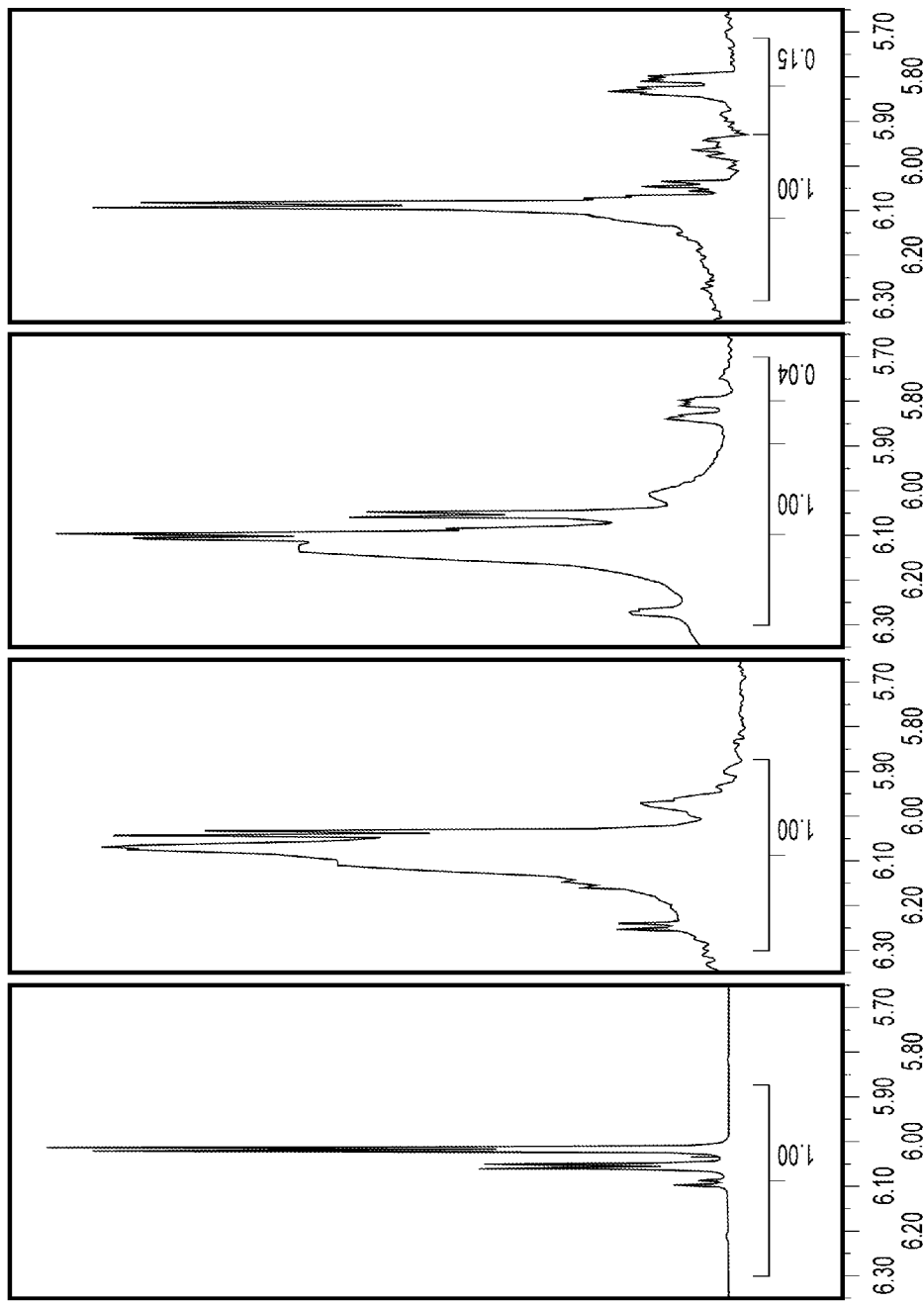
FIG. 10 illustrates $^1$H NMR spectra of TTMPP (A), uncrosslinked TPQPOH (B), SCL-TPQPOH25% (C), and SCL-TPQPOH67% (D) in detuterated choloroform (CDCl$_3$) with tetramethylsilane (TMS) as an internal standard for measuring the amounts of each of A, B, C and D.

16. Crosslinking confirmation by $^1$H NMR spectroscopy:

The crosslinking was confirmed by $^1$H NMR spectra. FIG. 10 shows $^1$H NMR spectra of TTMPP (A), uncrosslinked TPQPOH (B), SCL-TPQPOH25% (C), and SCL-TPQPOH67% (D). Both TPQPOH and SCL-TPQPOH used the same CMPSf186 as polymer precursor; Deuterated chloroform ($CDCl_3$) as solvent and tetramethylsilane (TMS) as internal standard. The shown numbers are the relative integral areas for the uncrosslinked trimethoxyl benzene ring aromatic-Hs, $H^u$s (from ~5.90 to 6.30 ppm), and the crosslinked trimethoxyl benzene ring aromatic-Hs, $H^c$s (from 5.70 to ~5.90 ppm).

Before crosslinking, the chemical shift of the aromatic-H of trimethoxyl benzene rings, $H^u$, is located at 6.05-6.15 ppm while after crosslinking, a new peak appeared at 5.80-5.85 ppm, and this is attributed to the aromatic-H of crosslinked trimethoxyl benzene rings, $H^c$. The $H^u$ peak decreases and the $H^c$ one increases, respectively, with increasing degree of crosslinking (DCL). DCL is defined as the percentage of the quaternary phosphonium group (containing three trimethoxyl benzene rings) that crosslinking-reacted with the chloromethyl group. The measured degrees of crosslinking ($DCL_m$s, based on $^1$H NMR) are consistent with the theoretical ones ($DCL_t$s, assuming all of the non-quaternized chloromethyl groups completely reacted with trimethoxyl benzene rings) (Table 12). Considering the fact that the crosslinking reaction was carried out at mild temperature (80° C.) and without the use of a catalyst, the self-crosslinking appears to have high reactivity and efficiency, in spite of the large steric hindrance of multiple methoxyl substituents. However, the crosslinking still has lower reactivity than and thus does not compete with the more active quaternary phosphorization reaction, allowing the simple one-batch method (first quaternary phosphorization, and then self-crosslinking) can be used to prepare SCL-TPQPOH membranes.

TABLE 12

Degrees of crosslinking ($DCL_{Self}$) of SCL-TPQPOHs.

| SCL-TPQPOH | $R_{TTMPP:CM}{}^a$ | $R_{CM:QPOH}{}^b$ | $DCL_t{}^c$ | $DCL_m{}^d$ |
|---|---|---|---|---|
| SCL-TPQPOH-25%[e] | 0.80 | 0.25 | 25% | 22% |
| SCL-TPQPOH-67%[e] | 0.60 | 0.67 | 67% | 69% |

[a]$R_{TTMPP:CM}$, molar ratio of the added tertiary phosphonium (TTMPP) to the initial chloromethyl group (CM) of CMPSf.
[b]$R_{CM:QPOH}$, molar ratio of the residual chloromethyl group (CM) to formed quaternary phosphonium group (QPOH) after quaternary-phosphorization.
[c]$DCL_t$, theoretical degree of crosslinking, assuming all of the residual chloromethyl groups completely crosslinked with quaternary phosphonium groups.
[d]$DCL_m$, measured degree of crosslinking from $^1$H NMR spectra, $DCL_m = 6A(H^c)/[A(H^u) + 2A(H^c)] \times 100\%$.
[e]CMPSf186 was the polymer precursor.

17. SCL-TPQPOH hydroxide conductivity: The hydroxide conductivity is 38 mS cm$^{-1}$ for SCL-TPQPOH5.3%, as shown in Table 13. Normalized IEC could be a more objective method to assess the intrinsic hydroxide conduction for the crosslinked HEMs. SCL-TPQPOH IEC-normalized hydroxide conductivity (30.9 mS g cm$^{-1}$·mmol$^{-1}$).

TABLE 13

Ion exchange capacity, hydroxide conductivity (in $H_2O$), and ion exchange capacity-normalized hydroxide conductivity of crosslinked HEMs reported.

| Crosslinking technique | Crosslinked HEM | $IEC^a$/ mmol g$^{-1}$ | $HC^b$/mS cm$^{-1}$ | $HC_{IEC}{}^c$/mS g cm$^{-1}$ mmol$^{-1}$ |
|---|---|---|---|---|
| Self-crosslinking | SCL-TPQPOH | 1.23 | 38 (20° C.) | 30.9 |

[a]IEC, ion exchange capacity.
[b]HC, hydroxide conductivity.
[c]$HC_{IEC}$, ion exchange capacity-normalized hydroxide conductivity.
r.t., room temperature.

Figure 11:
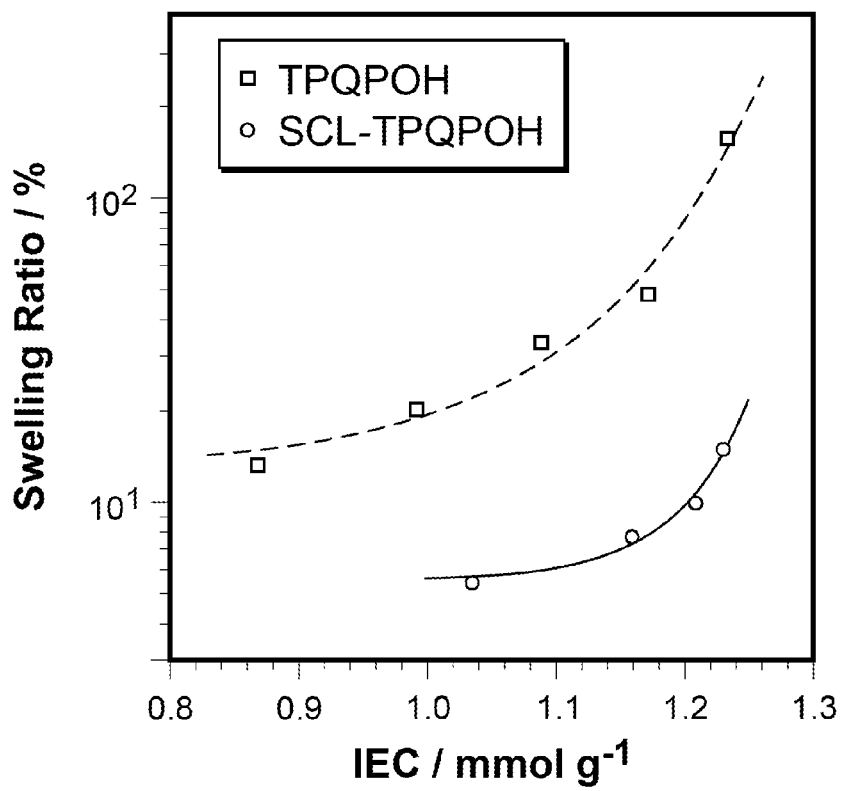
FIG. 11 illustrates the swelling ratio at 60° C. of uncrosslinked (squares) and self-crosslinked (circles) TPQPOH as a function of ion exchange capacity.
Figure 12:
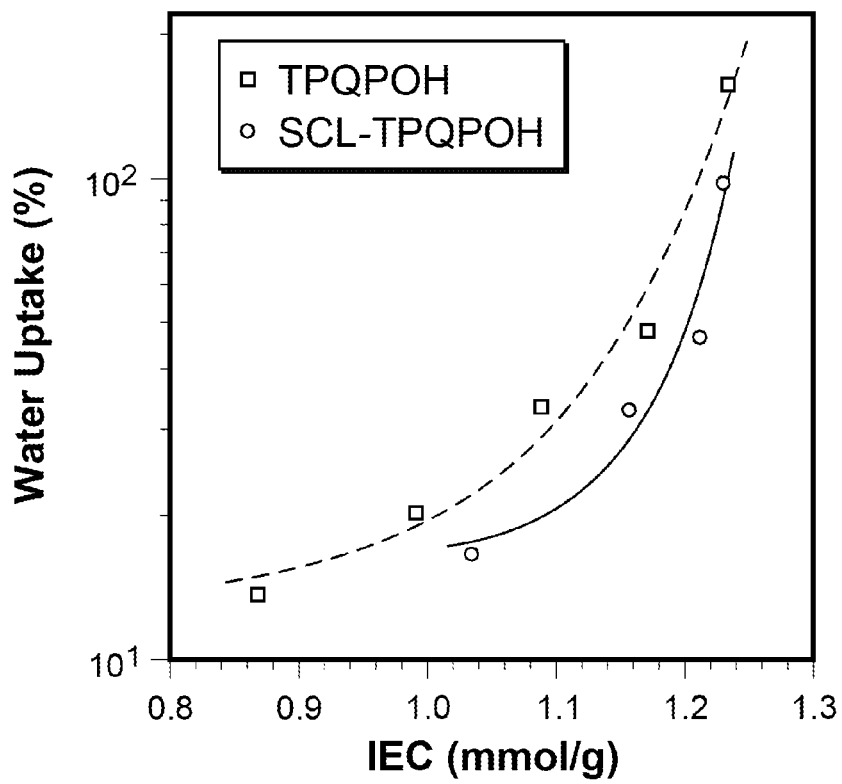
FIG. 12 illustrates water uptake of uncrosslinked TPQPOHs (squares) and SCL-TPQPOHs (circles) at 60° C. as a function of IEC. CMPSf186 was the polymer precursor of SCL-TPQPOHs.

Comparison of Swelling ratio between uncrosslinked and self-crosslinked TPQPOH: FIG. 11 shows swelling ratio at 60° C. of uncrosslinked (squares) and self-crosslinked (circles) TPQPOH versus ion exchange capacity. CMPSf186 was the polymer precursor of self-crosslinked TPQPOHs. Self-crosslinking drastically lowers the swelling ratio for TPQPOHs (5-10 folds reduction with similar ion exchange capacity, IEC, FIG. 11), and water uptake is also lowered (FIG. 12), indicating SCL-TPQPOH have high dimensional stability. Specifically, SCL-TPQPOH5.3% (DCL: 5.3%, IEC: 1.23 mmol g$^{-1}$, hydroxide conductivity, HC: 38 mS cm$^{-1}$) has a swelling ratio of 15% that is significantly smaller than the uncrosslinked TPQPOHs (157% of TPQPOH178 and hydrogel of TPQPOH186), Solvent Solubility$^a$ of TPQPOH and SCL-TPQPOH: Table 14 suggests SCL-TPQPOH membranes have excellent solvent-resistance. Considering the remarkable agreement between $DCL_m$, and $DCL_t$, and the low swelling ratio and high solvent resistance, a strong covalent crosslinking network have likely been created by the self-crosslinking. All SCL-TPQPOHs (DCL: 5.3%-67%) are insoluble, even at elevated temperature, in common good solvents that can readily dissolve the uncrosslinked TPQPOH membranes.

TABLE 14

Solubility$^a$ of TPQPOH and SCL-TPQPOH

| Solvent | Boiling point (° C.) | TPQPOH (20° C.) | SCL-TPQPOH$^b$ (20-80° C.) |
|---|---|---|---|
| Acetone | 58 | + | − |
| Methanol | 65 | + | − |
| Ethanol | 78 | + | − |
| n-Propanol | 97 | + | − |
| N,N-Dimethyl-formamide (DMF) | 153 | + | − |
| Dimethylacetamide (DMAc) | 166 | + | − |
| Dimethyl sulfoxide (DMSO) | 189 | + | − |

TABLE 14-continued

Solubility[a] of TPQPOH and SCL-TPQPOH

| Solvent | Boiling point (° C.) | TPQPOH (20° C.) | SCL-TPQPOH[b] (20-80° C.) |
|---|---|---|---|
| N-Methyl-2-pyrrolidone (NMP) | 204 | + | − |

[a]+: Soluble, −: Insoluble.
[b]DCL of SCL-TPQPOH: 5.3%-67%.

Figure 13A:
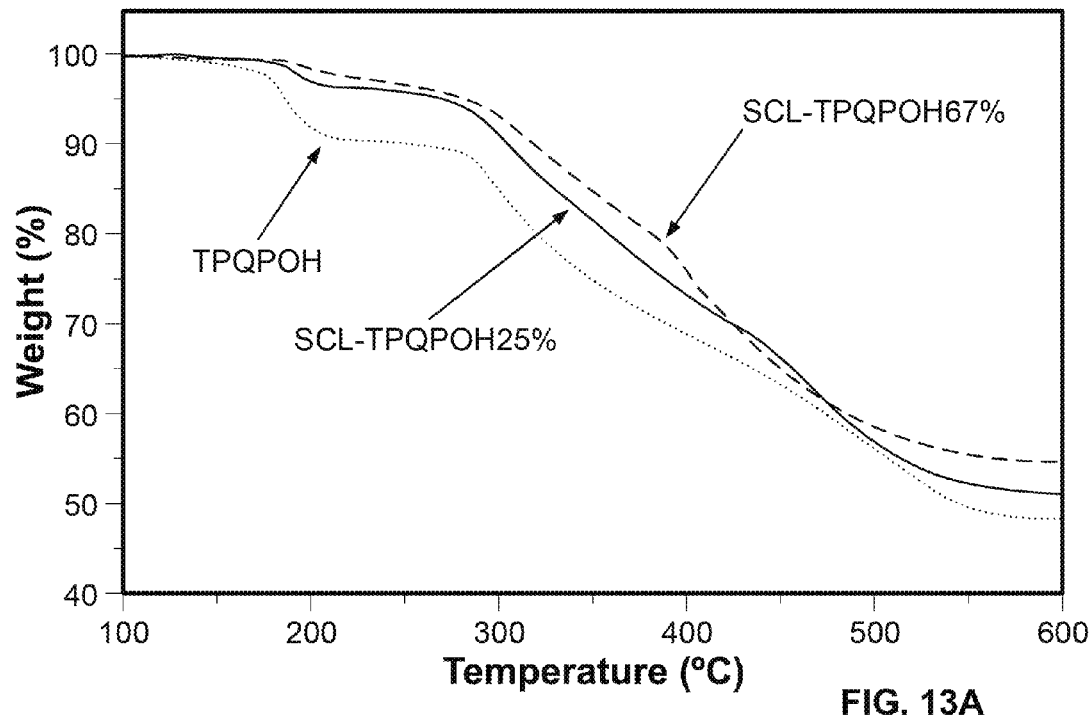
FIG. 13 illustrates TGA curves (A) and DTG curves (B) of uncrosslinked TPQPOH, SCL-TPQPOH25%, and SCL-TPQPOH67% in N2 atmosphere and at a 10° C./min heating rate. CMPSf186 was the polymer precursor of SCL-TPQPOHs.
Figure 13B:
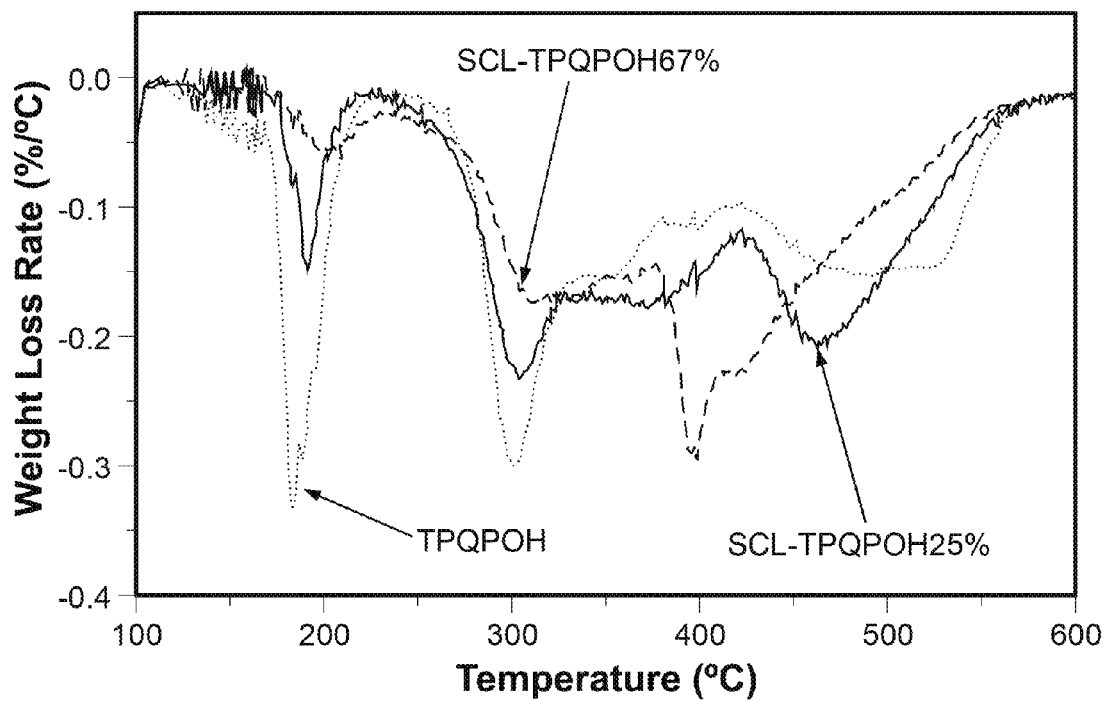
Figure 14:
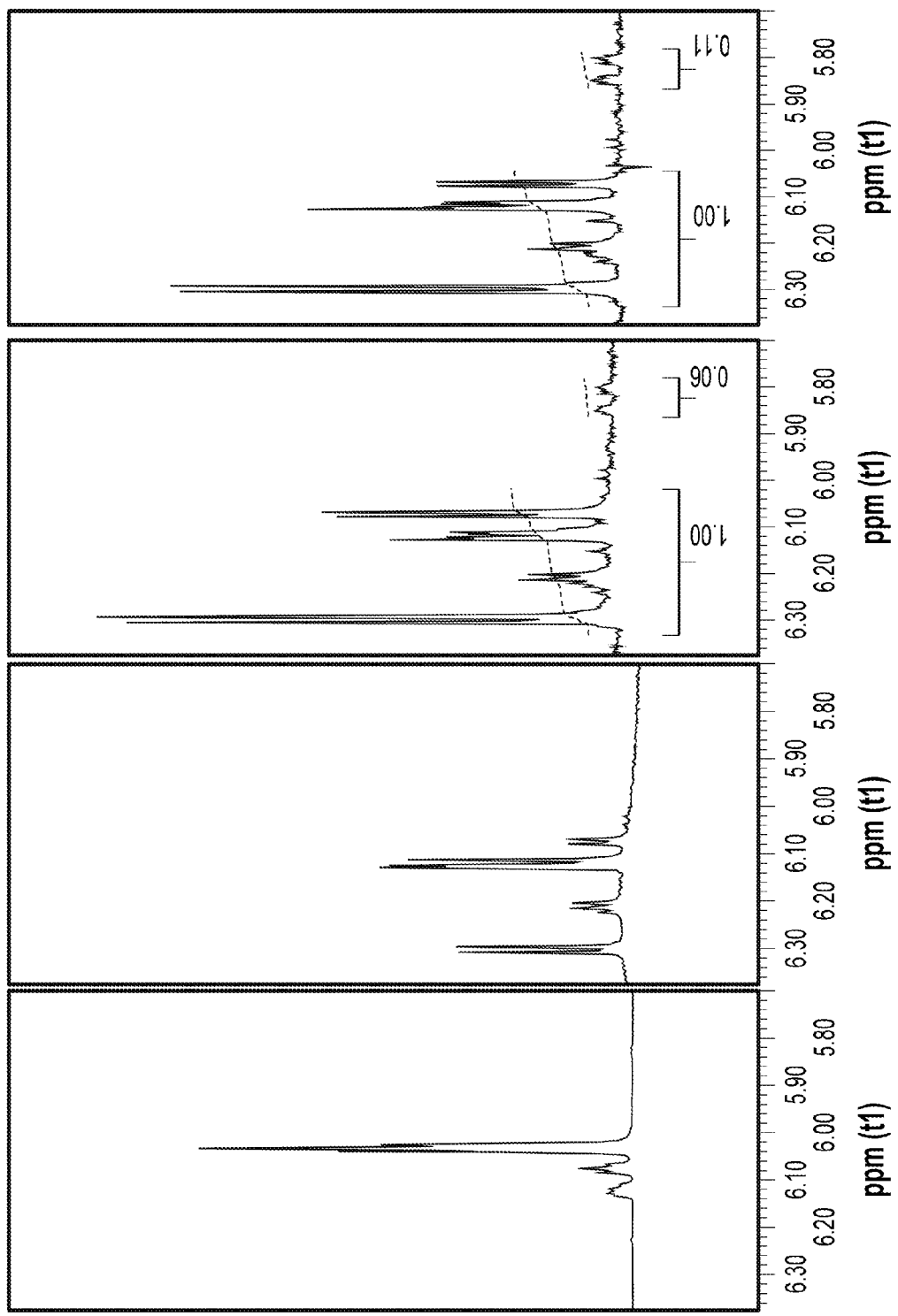
FIG. 14 illustrates $^1$H-NMR spectra for (a) TTMPP, (b) uncrosslinked PVBC-QPOH, (c) ECL-PVBC-QPOH-30%, (d) ECL-PVBC-QPOH-50%. (Solvent:DMSO-d6), the shown numbers are the relative integral areas for hydrogen from crosslinked and uncrosslinked trimethoxyl benzene rings

18. Thermal Decomposition temperature of uncrosslinked TPQPOH and SCL-TPQPOH: FIG. 13 and Table 15 shows SCL-TPQPOH has enhanced thermal stability with both $T_{OD}$ and $T_{FD}$ (fastest-weight-loss decomposition temperature) increased after self-crosslinking the ionomer. The degree of self-crosslinking also slightly impacts the thermal stability: higher DCL leads to higher $T_{OD}$ and $T_{FD}$.

TABLE 15

Thermal decomposition temperatures of uncrosslinked TPQPOH and SCL-TPQPOHs. N$_2$ atmosphere and 10° C./min heating rate.

| HEM | | $T_{OD}^a$ (° C.) | $T_{FD}^b$ (° C.) |
|---|---|---|---|
| Uncrosslinked HEM | TPQPOH[c] | 178 | 184 |
| Crosslinked HEM | SCL-TPQPOH25%[c] (this work) | 183 | 192 |
| Crosslinked HEM | SCL-TPQPOH67%[c] (this work) | 186 | 203 |

[a]$T_{OD}$, onset decomposition temperature.
[b]$T_{FD}$, fastest-weight-loss decomposition temperature.
[c]CMPSf186 was the polymer precursor.

19. Solvent resistance of SCL-TPQPOH: Pristine TPQPOH has excellent solubility in many ordinary solvents. However, Table 16 shows that SCL-TPQPOH loses solubility in the typical solvents.

TABLE 16

Solvent resistance of SCL-TPQPOH

| Solvent | TPQPOH[a] | SCL-TPQPOH[b] |
|---|---|---|
| Water | Insoluble | Insoluble |
| Ethanol | Soluble | Insoluble |
| DMF | Soluble | Insoluble |
| NMP | Soluble | Insoluble |

[a]DCM: 50-186%
[b]DCL$_{Self}$: 60-95%, DCM: 186%

This solvent resistance of SCL-TPQPOH can be advantageous for HEMs, considering the diversity of fuels (including low-level alcohols) for HEMFCs and long-term stability of the HEMs.

20. Water uptake and swelling ratio of SCL-TPQPOH: Table 17 shows the water uptake and swelling ratio of SCL-TPQPOH HEM.

TABLE 17

Water uptake and swelling ratio (60° C.) of SCL-TPQPOH

| Sample | Water uptake/% | Swelling ratio/% |
|---|---|---|
| TPQPOH186 | ~3000 | ~200 |
| SCL-TPQPOH186-DCL$_{Self}$09 | 85 | 15 |
| SCL-TPQPOH186-DCL$_{Self}$14 | 70 | 9 |
| SCL-TPQPOH186-DCL$_{Self}$23 | 30 | 8 |
| SCL-TPQPOH186-DCL$_{Self}$41 | 70 | 6 |

Here, DCL$_{Self}$ means "degree of self-cross-linking." Because of high hydrophilicity, pristine TPQPOH186 has a water uptake of around 3000% and a swelling ratio of 200%. This very poor mechanical stability prevents pristine TPQPOH186 from practical application as an HEM in HEMFCs. However, it is apparent that self-cross linking can significantly reduce water uptake and swelling ratio by about 1-2 orders of magnitude. Thus, SCL-TPQPOH with high DCMs are possibly applicable for use as HEMs. Water uptake (swelling ratio) of TPQPOH186 at 60° C. can be selected to be any value between about 98% (about 15%) and about 17% (about 6%) by choosing a DCL$_{Self}$ between about 5% and about 40%.

21. Hydroxide conductivity of SCL-TPQPOH: Table 18 shows hydroxide conductivity of SCL-TPQPOH.

TABLE 18

Hydroxide conductivity (20° C.) of SCL-TPQPOH

| Sample | Hydroxide conductivity/ MS/cm |
|---|---|
| TPQPOH186 | Gel |
| SCL-TPQPOH186-DCL$_{Self}$05 | 32 |
| SCL-TPQPOH186-DCL$_{Self}$10 | 20 |
| SCL-TPOPOH186-DCL$_{Self}$20 | 13 |
| SCL-TPQPOH186-DCL$_{Self}$40 | 4 |

Even though conductivity decreases with increasing DCL$_{Self}$ because IEC also decreases, SCL-TPQPOHs having lower DCL$_{Self}$s, e.g. 5% (05) and 10% (10), still have significantly high hydroxide conductivity, up to 20-32 mS/cm. Since as shown previously, water uptake and swelling ratio with DCL$_{Self}$s of approximately 5%-10% are low, e.g., 10-15%, ionomer SCL-TPQPOH186-DCL$_{Self}$05 and SCL-TPQPOH186-DCL$_{Self}$10 have an advantageous balance of high conductivity and good dimension stability. Hydroxide conductivity of TPQPOH186 at 20° C. can be selected to be any value between about 32 mS/cm and about 4 mS/cm by choosing a DCL$_{Self}$ between about 5% and about 40%.

22. Ex-Situ Cross Cross-Linked TPQPOH (ECL-TPQPOH)
23. Multi-Halogenated Cross-linked TPQPOH: Multi-halogenated cross-linked TPQPOH has been prepared by reacting TPQPOH with 1,3-dichloropropane. Multi-halogenated cross-linked PVC-TTMOPP and PVBC-TTMOPP have been similarly prepared. A di-chloromethylated hydrocarbon cross-linking, as an embodiment is shown in Scheme 7. The halogenated alkyl/phenyl group (here, chloromethylated methylene) can covalently link to the TTMOPP from different polymer chains by the condensation we mentioned before, forming the multi-halogenated cross-linked polymers.

Scheme 7. Multi-halogenated (here, di-chloromethylated) hydrocarbon cross linking of TPQPCl

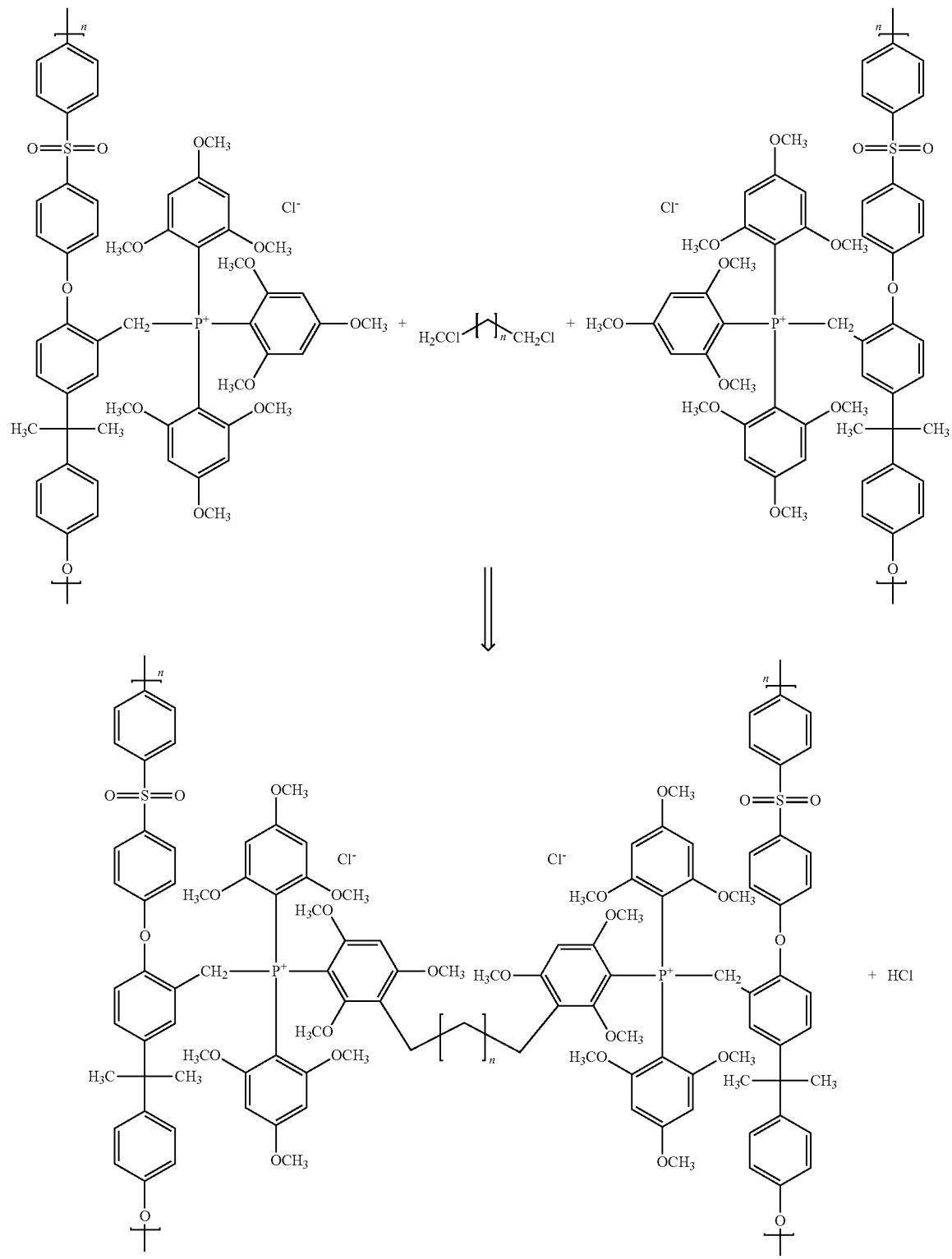

24. PVBC-QPOH and SCL-PVBC-QPOH

PVBC is another important commercial polymer. Because of excessively high IEC (1.5 mmol/g), pristine quaternary-phosphonium functionalized PVBC is water-soluble polymer, and accordingly, is not suitable for HEMs.

However, self-cross linking is not limited to polysulfone; it can also be applied to, at least, PVBC, as shown in Scheme 8.

Based on synthesis procedures similar to those used with PSf, SCL quaternary-phosphonium ((tris(2,4,6-trimethoxyphenyl)phosphine) functionalized PVBC, SCL-PVBC-QPOH was synthesized. An advantage that PVBC offers as a polymer backbone that is the initial chloromethylation step is not required since methyl chloride functional groups are already present on the starting polymer and available to react with the TTMOPP moiety.

SCL-PVBC-QPOH HEMs with $DCL_{Self}$s of approximately 10-50% were found to have a flexible and tough membrane morphology, to exhibit good dimension stability (swelling ratio of 5-10%), and to have high hydroxide conductivity (10-40 mS/cm)).

Scheme 8. Self-cross linked quaternary-phosphonium ((tris(2,4,6-trimethoxyphenyl) phosphine) functionalized PVBC, (SCL-PVBC-QPOH)

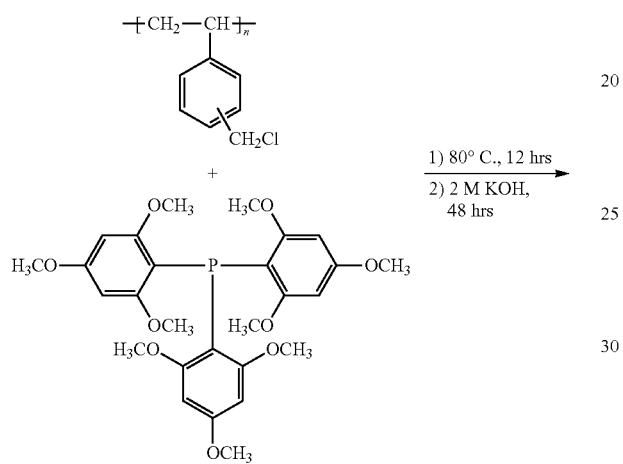

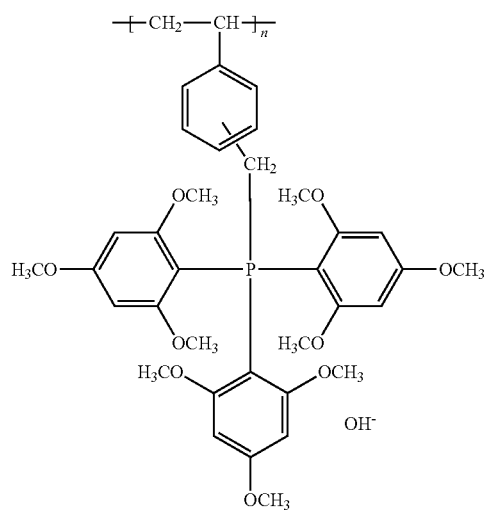

25. ECL-PVBC-QPOH

Friedel-Crafts electrophilic reaction was employed to crosslink tri(2,4,6-trimethoxyphenyl) poly(vinylbenzyl chloride) quaternary phosphonium hydroxide using 4,4'-bis(chloromethyl)-1,1'-biphenyl (CMBP) as the ex-situ crosslinker (ECL-PVBC-QPOH), as shown in Scheme 9.

Scheme 9. Synthesis of crosslinked membran (ECL-PVBC-QPOH)

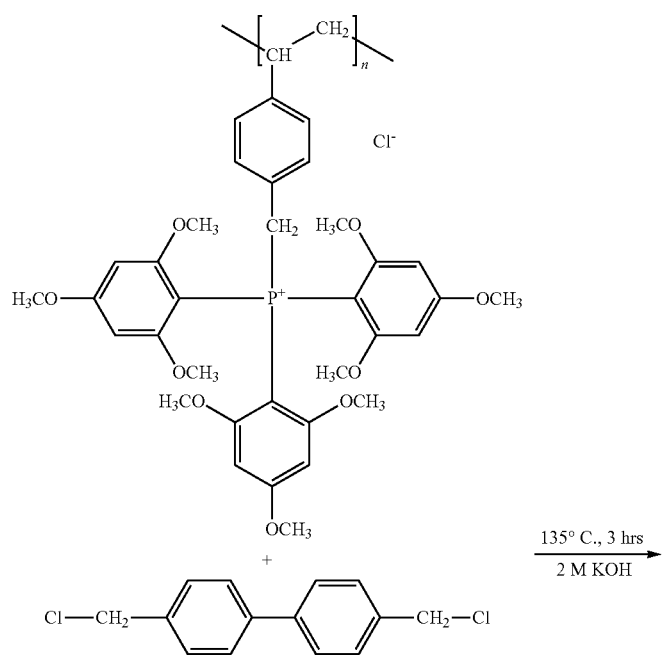

-continued

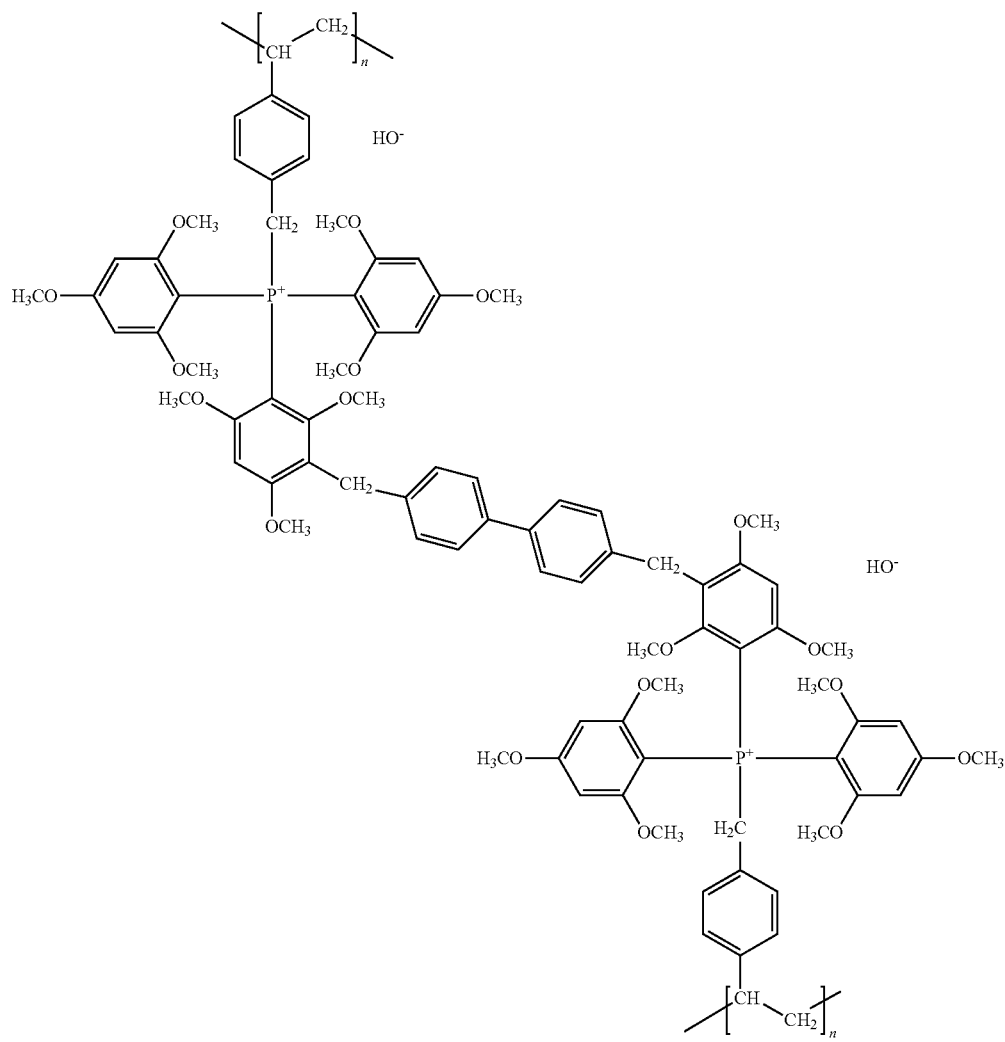

PVBC has a molecular weight ($M_n$) of 55,000 and contains 3- and 4-isomers (60/40 mixture). 1 mmol poly(vinylbenzyl chloride) (PVBC) and 1 mmol tris(2,4,6-trimethoxyphenyl) phosphine (TTMPP) was dissolved into 1.5 ml N-methyl-2-pyrrolidone (NMP), and reacted at 75° C. for 24 hours. Varied concentrations (0.05 mmol; 0.15 mmol and 0.25 mmol) of the crosslinker 4,4'-bis(chloromethyl)-1,1'-biphenyl (CMBP) was added and dissolved into the reaction mixture of the prior step The solution was then poured onto a flat petri-dish followed by the evaporation of NMP at 30° C. for 24 hours. The membrane was heated to 135° C. crosslink at for 3 hours to obtain ECL-PVBC-QPCl membrane. The ECL-PVBC-QPOH membrane was obtained by treating the C-PVBC-PQPCI in 2M KOH at room temperature for 48 hours, then followed by thorough washing and immersion in D.I. water for 24 hours to remove any residual KOH.

The degree of crosslinking (DCL) may be precisely controlled by changing the ratio of CMBP over PVBC, as seen in Table CL2 and Figure ECL1. DCL is defined as the average percentage of the quaternary phosphonium group containing three trimethoxyl phenyl rings that crosslinked with the chloromethyl groups of CMBP. When trimethoxyl benzene ring is crosslinked by CMBP, the $^1$H NMR chemical shift for aromatic-H located in trimethoxyl benzene rings will switch from 6.04-6.34 ppm to 5.76-5.88 ppm, as seen in Figure ECL1. The experimental $DCL_{Self}$ are consistent with the theoretical ones, e.g. the experimental DCL for ECL-PVBC-QPOH-30% is 32% while the theoretical DCL is 30%. This agreement in DCL values indicates that all chloromethyl groups of CMBP were reacted with trimethoxyl phenyl rings to form crosslinked networks. This is also confirmed by the disappearance of chemical shif peaks in the range of 4.6-4.8 ppm, the chemical shift range for the H in the chloromethyl group in $^1$H-NMR spectrum.

For TTMPP, the chemical shift signal of $^{31}$P atom located at −65.7 ppm. After the quaternarization with PVBC, the $^{31}$P atom signal shifted to +6.6 ppm, and no signal was found at −65.7 ppm. This $^{31}$P-NMR spectroscopy results indicate that all TTMPP was reacted with chloromethyl groups (—$CH_2Cl$) of PVBC.

The swelling ratios for ECL-PVBC-QPOH-30% and ECL-PVBC-QPOH-50% are 25% and 19% (as seen in Table 19)

TABLE 19

Properties of ECL-PVBC-QPOH and other quaternary phosphonium or flexibleHEMs[a]

| HEMs | IEC (mmol/g) | HC (mS/cm) | Water uptake (%) | Swelling ratio (%) | HC$_{IEC}$ (mS g/mmol cm) |
|---|---|---|---|---|---|
| ECL-PVBC-QPOH-10% | 1.48 | 62/20° C. | 239 | 57 | 41.9 |
| ECL-PVBC-QPOH-30% | 1.44 | 53/20° C. | 109 | 25 | 36.8 |
| ECL-PVBC-QPOH-50% | 1.41 | 48/20° C. | 60 | 19 | 34.1 |
| TPQPOH-124 | 1.09 | 27 | 70 | / | 24.8 |
| TPQPOH-152 | 1.17 | 45 | 137 | / | 38.5 |
| SCL-TPQPOH | 1.23 | 38/20° C. | 98 | 15 | 30.9 |

HC: hydroxide conductivity;
HC$_{IEC}$: IEC-normalized hydroxide conductivity;
R.T.: room temperature
[a]TPQPOH: tri(2,4,6-trimethoxyphenyl) polysulfone-methylene quaternary phosphonium hydroxide
SCL-TPQPOH: self-crosslinked TPQPOH

TABLE 20

Crosslinking degree of ECL-PVBC-QPOH

| ECL-PVBC-QPOH | R$_{CMBP:TTMPP}$ | DCL$_t$ | DCL$_m$ |
|---|---|---|---|
| ECL-PVBC-QPOH-30% | 0.15 | 30% | 32% |
| ECL-PVBC-QPOH-50% | 0.25 | 50% | 54% |

R$_{CMBP:TTMPP}$: the mole ratio of CMBP to TTMPP;
DCL$_t$: the theoretical crosslinking degree;
DCL$_m$: the crosslinking degree calculated from $^1$H-NMR integral areas.

TABLE 21

Solubility of PVBC-QPOH and ECL-PVBC-QPOH in different solvents [a]

| Solvent | PVBC-QPOH (20° C.) | ECL-PVBC-QPOH [b] (20° C.-85° C.) |
|---|---|---|
| H2O | + | − |
| Methanol | + | − |
| Ethanol | + | − |
| Iso-propanol (IPA) | + | − |
| N,N-Dimethylformamide (DMF) | + | − |
| Dimethylacetamide (DMAc) | + | − |
| Dimethyl sulfoxide (DMSO) | + | − |
| N-Methyl-2-pyrrolidone (NMP) | + | − |

[a] +: soluble, −: insoluble.
[b] CD: 10%, 30%, and 50%

Although specific features of the invention are shown in some drawings and not in others, this is for convenience only as each feature may be combined with any or all of the other features in accordance with the invention. The words "including," "comprising," "having," and "with" as used herein are to be interpreted broadly and comprehensively and are not limited to any physical interconnection. The articles "a" or "an" or the like are also to be interpreted broadly and comprehensively as referring to both the singular and the plural. Moreover, any embodiments disclosed in the subject application are not to be taken as the only possible embodiments. Other embodiments will occur to those skilled in the art and are within the following claims.

What is claimed is:

1. A method of making crosslinked tri(2,4,6-trimethoxyphenyl) poly(vinylbenzyl chloride) quaternary phosphonium hydroxide (C-PVBC-QPOH-x%) ionomer membrane comprising:
   (a) preparing a mixture of poly(vinylbenzyl chloride) (PVBC) and tris(2,4,6-trimethoxyphenyl) phosphine (TTMPP) dissolved in an aprotic solvent;
   (b) reacting said mixture at greater than 75° C. and for about 24 hours;
   (c) introducing a short chain crosslinker into said mixture during said reaction;
   (d) casting and curing the reaction mixture at temperature about or less than 30° C. for 24 hours to form a highly basic ionomer membrane; and
   (e) heating said membrane to about 135° C. for 3 hours to complete the cross linking reaction with membrane;
   (f) wherein said crosslinker is introduced to said mixture to achieve a desired degree of crosslinking (DCL) of said highly basic ionomer membrane; and
   (g) wherein the ion exchange capacity of the membrane is about or greater than 1.4 mmol/g.

2. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said PVBC and TTMPP are initially introduced into said mixture to be about equimolar.

3. A method of making crosslinked tri(2,4,6-trimethoxypkenyl) poly(vinylbenzyl chloride) quaternary phosphonium hydroxide (C-PVBC-Q POH-x%) ionomer membrane as in claim 1, wherein said crosslinker is an ex-situ cross-linker.

4. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said crosslinker is 4,4'-bis(chloromethyl)-1,1'-biphenyl (CMBP).

5. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said aprotic solvent is nitrogen based.

6. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said aprotic solvent has a boiling point greater than 200° C.

7. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said PVBC reactant polymer initially has a molecular weight of about 55 kda.

8. A method of making crosslinked tri(2,4,6-aimethoxyphenyl) poly(vinylbenzyl chloride) quaternary phosphonium hydroxide (C-PVBC-QPOH-x%) ionomer membrane as in claim 1, wherein the ionic conductivity of said membrane is greater than 48 mS/cm measured at about 20° C.

9. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane has a swelling ratio of about 25 to about 57%.

10. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane has a water up take value of about 60 to 239%.

11. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane has a normalized ion conductivity of about 34.1 to 41.9 mSg/mmol cm.

12. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein the degree of crosslinking of said membrane measured by $^1$H NMR is about 10 to 50%.

13. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in $H_2O$ at temperature range of 20 to 85° C.

14. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in Methanol at temperature range of 20 to 85° C.

15. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in Ethanol at temperature range of 20 to 85° C.

16. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in Isopropanol (IPA) at temperature range of 20 to 85° C.

17. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in N,N-Dimethylformamide (DMF) at temperature range of 20 to 85° C.

18. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in Dimethylacetamide (DMAc) at temperature range of 20 to 85° C.

19. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in Dimethyl sulfoxide (DMSO) at temperature range of 20 to 85° C.

20. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane is not soluble in N-Methyl-2-pyrrolidone (NMP) at temperature range of 20 to 85° C.

21. A method of making crosslinked tri(2,4,6-trimethoxyphenyl) poly(vinylhenzyl chloride) quaternary phosphonium hydroxide (C-PVBC-QPOH-x%) ionomer membrane as in claim 1, wherein said membrane is able to sustain up to 300 kPa of fuel cell back pressure without leakage.

22. A method of making crosslinked tri(2,4,6-trimethoxyphenyl) poly(vinylbenzyl chloride) quaternary phosphonium hydroxide (C-PVBC-QPOH-x%) ionomer membrane as in claim 1, wherein said membrane does not self-crack.

\* \* \* \* \*